US011644791B2

(12) United States Patent
Sato

(10) Patent No.: US 11,644,791 B2
(45) Date of Patent: May 9, 2023

(54) HOLOGRAPHIC IMAGING DEVICE AND DATA PROCESSING METHOD THEREFOR

(71) Applicant: University of Hyogo, Kobe (JP)

(72) Inventor: Kunihiro Sato, Himeji (JP)

(73) Assignee: University of Hyogo, Kobe (JP)

( * ) Notice: Subject to any disclaimer, the term of this patent is extended or adjusted under 35 U.S.C. 154(b) by 0 days.

(21) Appl. No.: 16/642,994

(22) PCT Filed: Jul. 31, 2018

(86) PCT No.: PCT/JP2018/028725
§ 371 (c)(1),
(2) Date: Feb. 28, 2020

(87) PCT Pub. No.: WO2019/044336
PCT Pub. Date: Mar. 7, 2019

(65) Prior Publication Data
US 2020/0264559 A1    Aug. 20, 2020

(30) Foreign Application Priority Data
Aug. 30, 2017  (JP) .............................. JP2017-166256

(51) Int. Cl.
*G03H 1/08*    (2006.01)
*G03H 1/00*    (2006.01)
(Continued)

(52) U.S. Cl.
CPC ......... *G03H 1/0866* (2013.01); *G03H 1/0005* (2013.01); *G03H 1/0404* (2013.01);
(Continued)

(58) Field of Classification Search
CPC .. G03H 1/0866; G03H 1/0005; G03H 1/0404; G03H 1/0465; G03H 1/0808;
(Continued)

(56) References Cited

U.S. PATENT DOCUMENTS

| 9,360,423 B2 | 6/2016 | Yu et al. |
| 2004/0042015 A1 | 3/2004 | Price |

(Continued)

FOREIGN PATENT DOCUMENTS

| JP | 2005-537516 A | 12/2005 |
| JP | 2014-507645 A | 3/2014 |

(Continued)

OTHER PUBLICATIONS

Extended European Search Report issued in European Application No. 18849745.7 dated Jul. 29, 2020 (10 pages).

(Continued)

*Primary Examiner* — Audrey Y Chang
(74) *Attorney, Agent, or Firm* — Crowell & Moring LLP

(57) ABSTRACT

A holographic imaging device and method realizes both a transmission type and a reflection type, and also realizes a long working distance wide field of view or ultra-high resolution. Object light emitted from an object, sequentially illuminated with parallel illumination light whose incident direction is changed, is recorded on a plurality of object light holograms for each incident direction using off-axis spherical wave reference light. The reference light is recorded on a reference light hologram using in-line spherical wave reference light being in-line with the object light. An object light wave hologram and its spatial frequency spectrum at the object position are generated for each incident direction using each hologram. A synthetic spectrum which occupies a wider frequency space is generated by matching each spectrum in the overlapping area, and a synthetic object light wave hologram with increased numerical aperture is obtained thereby.

20 Claims, 18 Drawing Sheets

(51) Int. Cl.
   *G03H 1/04* (2006.01)
   *G03H 1/22* (2006.01)
(52) U.S. Cl.
   CPC ......... *G03H 1/0465* (2013.01); *G03H 1/0808* (2013.01); *G03H 1/2202* (2013.01); *G03H 2001/005* (2013.01); *G03H 2001/0413* (2013.01); *G03H 2001/0415* (2013.01); *G03H 2001/0445* (2013.01); *G03H 2001/0456* (2013.01); *G03H 2001/0473* (2013.01); *G03H 2001/0825* (2013.01); *G03H 2001/2239* (2013.01)
(58) Field of Classification Search
   CPC .......... G03H 1/2202; G03H 2001/005; G03H 2001/0413; G03H 2001/0415; G03H 2001/0445; G03H 2001/0456; G03H 2001/0473; G03H 2001/0825; G03H 2001/2239; G03H 1/26; G03H 2001/0471
   USPC ...................................................... 359/9, 29
   See application file for complete search history.

(56) References Cited

U.S. PATENT DOCUMENTS

| | | | |
|---|---|---|---|
| 2006/0139711 A1* | 6/2006 | Leister | G03H 1/0005 |
| | | | 359/9 |
| 2012/0294136 A1 | 11/2012 | Sato | |
| 2013/0100241 A1 | 4/2013 | Sato | |
| 2013/0280752 A1 | 10/2013 | Ozcan et al. | |
| 2015/0205260 A1* | 7/2015 | Awatsuji | G03H 1/0443 |
| | | | 348/40 |
| 2015/0268628 A1 | 9/2015 | Sato | |
| 2016/0259297 A1* | 9/2016 | Sato | G02B 21/365 |
| 2016/0320485 A1* | 11/2016 | Cheng | G03H 1/265 |
| 2017/0199495 A1* | 7/2017 | Matsubara | G03H 1/0443 |

FOREIGN PATENT DOCUMENTS

| | | |
|---|---|---|
| JP | 2017-122890 A | 7/2017 |
| WO | WO 2008/020083 A2 | 2/2008 |
| WO | WO 2008/037007 A1 | 4/2008 |
| WO | WO 2011/089820 A1 | 7/2011 |
| WO | WO 2012/005315 A1 | 1/2012 |
| WO | WO 2014/054776 A1 | 4/2014 |
| WO | WO 2015/064088 A1 | 5/2015 |

OTHER PUBLICATIONS

International Search Report (PCT/ISA/210) issued in PCT Application No. PCT/JP2018/028725 dated Oct. 16, 2018 with English translation (five (5) pages).

Japanese-language Written Opinion (PCT/ISA/237) issued in PCT Application No. PCT/JP2018/028725 dated Oct. 16, 2018 (three (3) pages).

Martínez-León, "Improved resolution synthetic aperture holographic imaging," Three-Dimensional TV, Video, and Display VI, 2007, Proc. of SPIE, pp. 67780A-1-67780A-8, vol. 6778 (eight (8) pages).

Gutzler et al., "Coherent aperture-synthesis, wide-field, high-resolution holographic microscopy of biological tissue," Optics Letters, Apr. 15, 2010, pp. 1136-1138, vol. 35, No. 8 (three (3) pages).

* cited by examiner

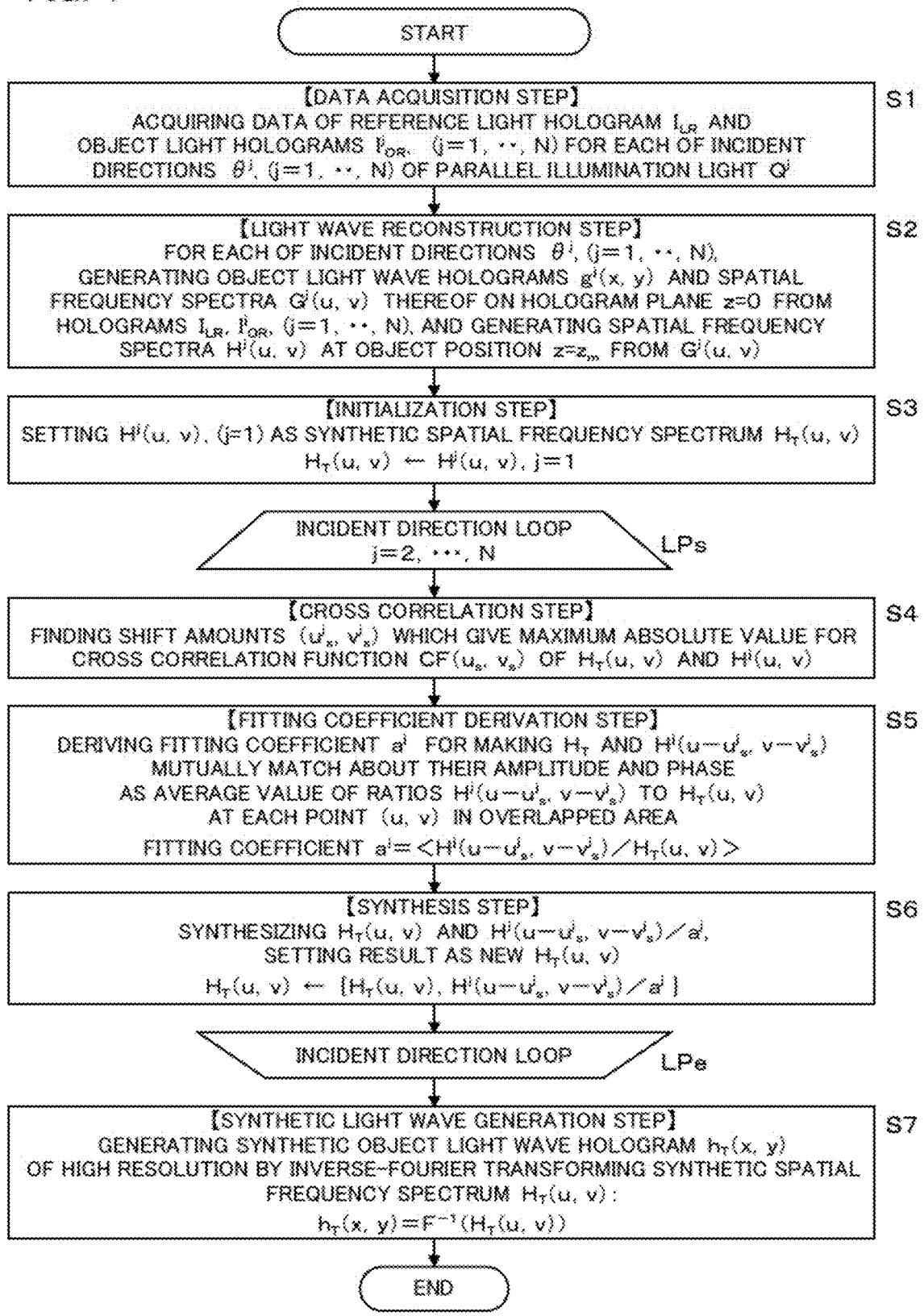

SYNTHESIZING SPATIAL FREQUENCY SPECTRA $H^j$ OF DIFFERENT OBJECT LIGHTS $O^j$, (j=1~9)

SYNTHESIZING SPATIAL FREQUENCY SPECTRA $H^j$ OF DIFFERENT OBJECT LIGHTS $O^j$, (j=1~21)

FIG. 10
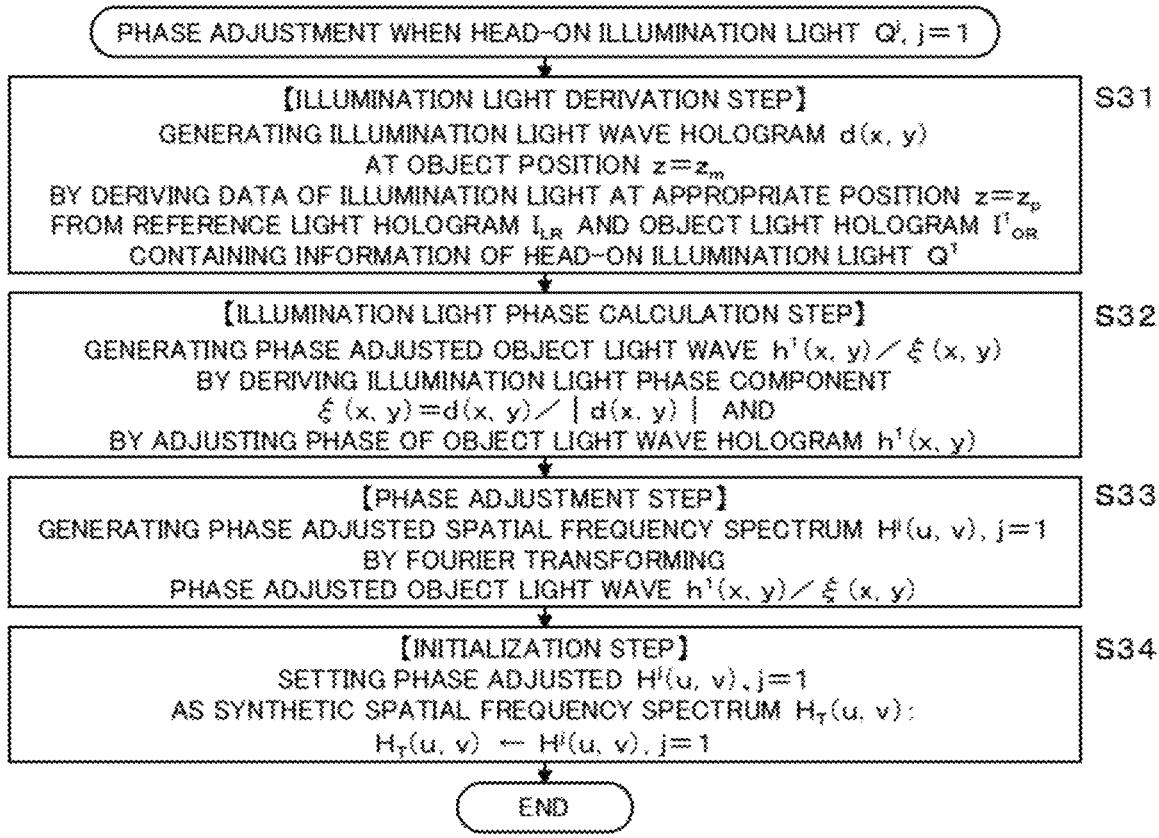
FIG. 11
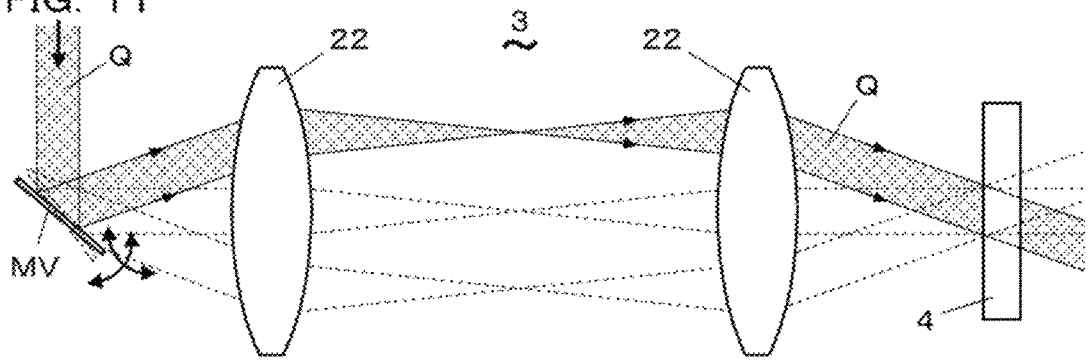
FIG. 12
SYNTHESIZING SPATIAL FREQUENCY SPECTRA $H^j$ OF DIFFERENT OBJECT LIGHTS $O^j$, ($j=1\sim9$)

FIG. 13A
FIG. 13B
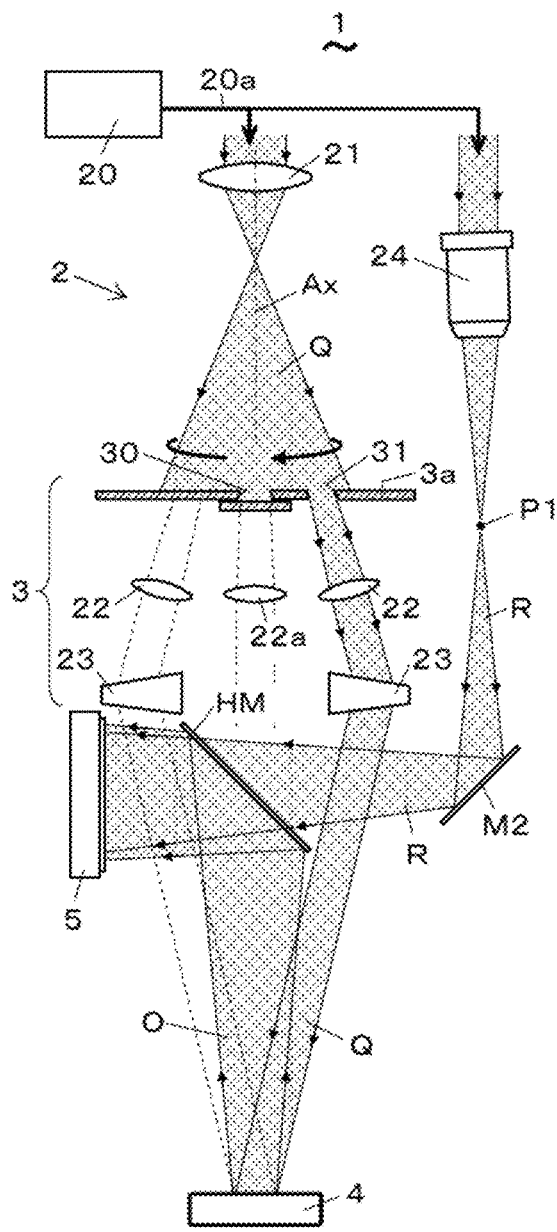
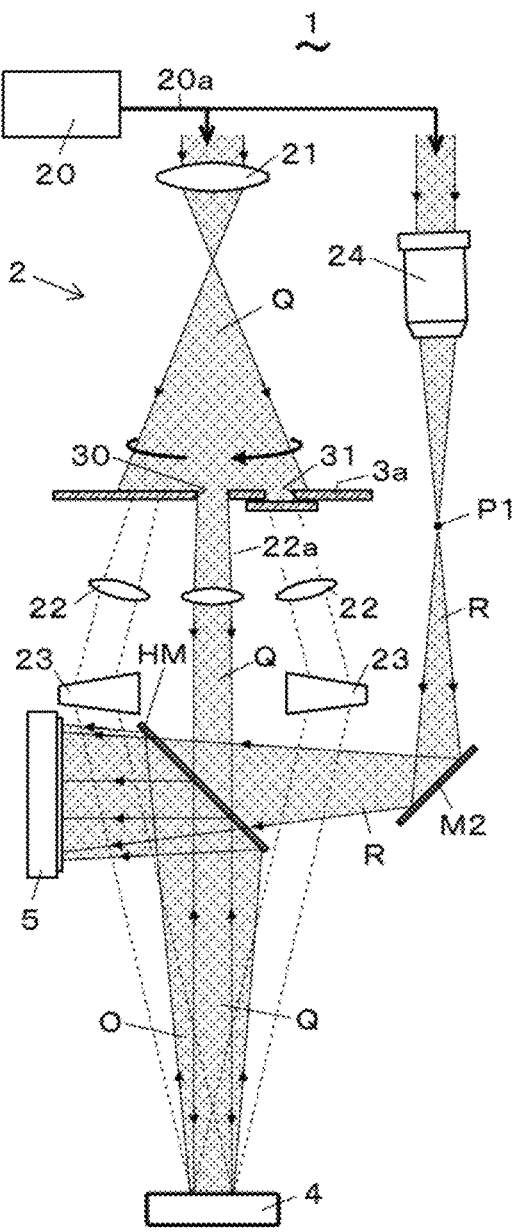

FIG. 30A
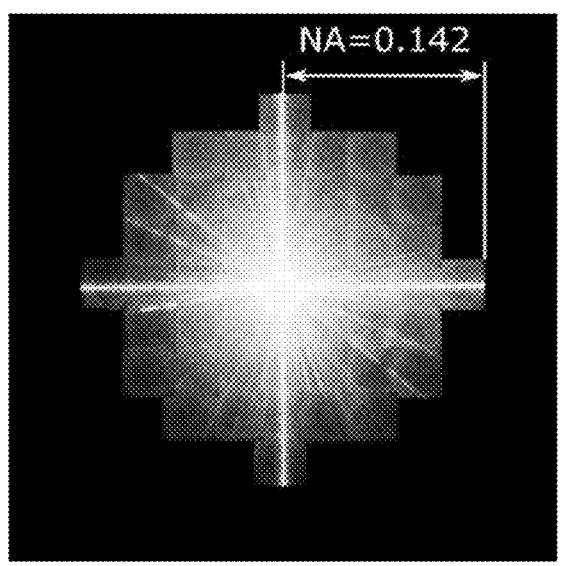
FIG. 30B
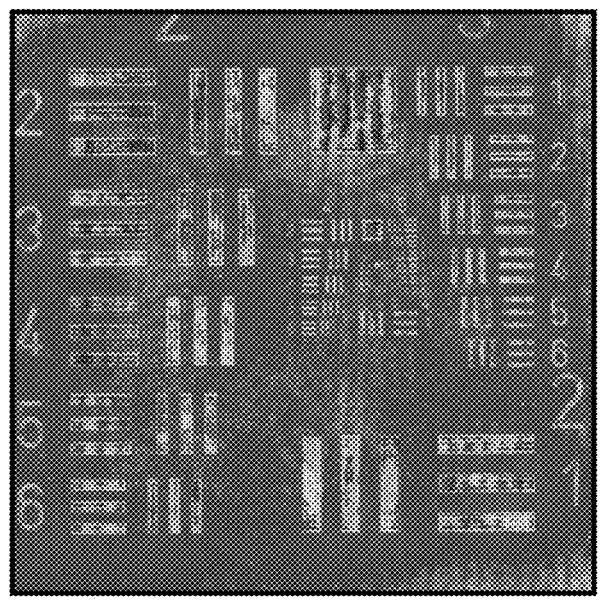
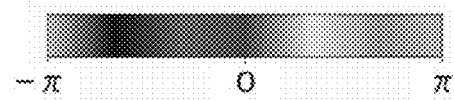
FIG. 31A
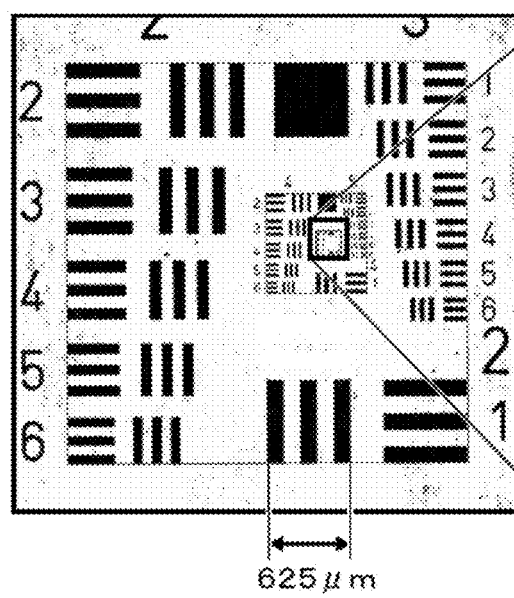
FIG. 31B
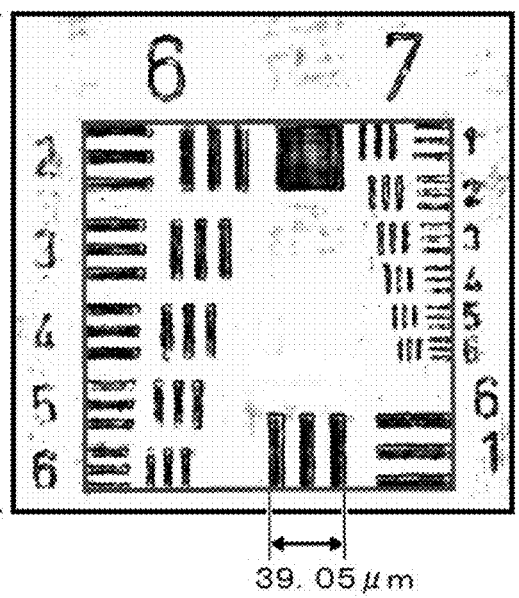

HOLOGRAPHIC IMAGING DEVICE AND DATA PROCESSING METHOD THEREFOR

TECHNICAL FIELD

The present invention relates to digital holography, and relates to a holographic imaging device for improving resolution and a data processing method used for the device.

BACKGROUND ART

Conventionally, there is a holography technique for analyzing light waves such as reflected light and transmitted light by recording on a recording medium, such as a photographic plate called hologram, together with light intensity and phase data. In holography in recent years, data of the intensity and phase of a light wave are acquired as digital data using a photo-detector and a semiconductor memory and the like, or a hologram itself is generated as digital data on a computer, so as to be analyzed. Such a holography is called a digital holography.

In the digital holography, various techniques have been proposed for achieving high-speed and high-precision acquisition and processing of hologram data, and are applied to imaging. For example, a digital holography has been known, in which spatial frequency filtering and spatial heterodyne modulation are applied to hologram data, acquired with one shot, to generate a complex amplitude in-line hologram for reconstructing an object image at a high speed and accurately (for example, patent document 1).

In order to solve the problem of the conventional optical microscope, a method for accurately acquiring object light of a large numerical aperture by one shot using holography without using any imaging lens and a method for accurately reconstructing high resolution three-dimensional image on a computer are known (for example, patent document 2). According to these method, a lens-less three-dimensional microscope is realized, which is capable of acquiring and reconstructing an undistorted high-resolution three-dimensional moving image. Since such a microscope does not use any imaging lens, it is possible to solve the problem of the conventional optical microscope, namely, the problem caused by the influenced of a medium and an imaging lens.

Moreover, there is known a high resolution tomography, which uses a reflected type lens-less holographic microscope and wavelength sweep laser light, for measuring the cell in culture solution or the structure in a living body tissue with high resolution (for example, patent document 3).

Furthermore, there is known a method for reconstructing object light achieving a synthetic numerical aperture exceeding 1, by synthesizing a plurality of large numerical aperture object lights, which are derived from a plurality of hologram data of object lights, each of which has a large numerical aperture emitted from an object illuminated, respectively, with one of illumination lights having different incident directions (for example, patent document 4). According to this method, an ultra-high resolution three-dimensional microscope having a resolution exceeding usual diffraction limit can be realized.

Further, there is known a transmission type holographic microscope, having an optical system with a spatial filter made of pinholes arranged in the optical path, which reduces optical path difference between illumination light and off-axis reference light so as to limit the common noise in the optical path (for example, patent document 5).

It is also known to increase the resolution by increasing the numerical aperture by synthesizing a plurality of holograms obtained at a plurality of positions by moving a CCD for imaging along the hologram plane (for example, non-patent document 1).

In addition, there is known a holographic microscope which obtains a synthetic numerical aperture 0.93 being 25 times that of each of single holograms obtained by rotating a specimen under oblique incident illumination light, wherein the holograms are synthesized by connecting mutually overlapping portions in a spatial frequency space (for example, non-patent document 2).

PRIOR ART DOCUMENTS

Patent Documents

Patent documents 1: WO2011/089820
Patent documents 2: WO2012/005315
Patent documents 3: WO2014/054776
Patent documents 4: WO2015/064088
Patent documents 5: U.S. Pat. No. 9,360,423

Non Patent Documents

Non-patent document 1: MARTINEZ-LEON Lluis, JAVIDI Bahram, Improved resolution synthetic aperture holographic imaging, Proc SPIE, Vol. 6778, pp 67780A-1-67780A-8 (2007)

Non-patent document 2: Thomas GUTZLER et al., Coherent aperture-synthesis, wide-field, high-resolution holographic microscopy of biological tissue, Opt Lett, Vol. 35, No. 8, pp 1136-1138 (2010)

DISCLOSURE OF THE INVENTION

However, in imaging techniques and microscopes as described in the above-mentioned patent documents 1, 2, and 3, the resolution can not exceed the half wavelength of light as well as in the conventional optical microscope. The ultra-high resolution three-dimensional microscope as disclosed in the above-mentioned patent document 4 can have a resolution exceeding a half wavelength of light, but in order to synthesize light waves, it is necessary to record object light and illumination light as one hologram simultaneously. This simultaneous recording condition is a great limitation for the microscope using this technology, and makes it difficult to improve the performance and function.

Also, the microscope as disclosed in the above-mentioned patent document 5 does not increase the resolution even if noise can be reduced. The method shown in non-patent document 1 is to make a small CCD have function as a large CCD by moving the small CCD, and gives no function for exceeding the limit of resolution of a half wavelength of light in a conventional optical microscope.

The microscope as described in non-patent document 2 has a problem that the object to be photographed is limited to a sample that can be rotated at the time of photographing, and it is considered that noise caused by the positional change, for rotating the sample, makes it difficult to improve the resolution. Since the microscope of non-patent document 2 uses an objective lens to collimate the object light to record an off-axis hologram, the microscope has problems, namely, its focal depth cannot be deepened, it can not be applied to an object in the medium, the numerical aperture of the CCD can not be enlarged, distortion occurs in the image, and the like. For such a microscope, a highly precise rotational support mechanism is indispensable, and the microscope becomes expensive.

The resolution of the usual optical microscope cannot exceed the light half-wavelength, namely, the diffraction limit of light. As a microscope that exceeds such a resolution limit, there is a structured illumination microscope (SIM) using the moire effect. SIM has a number of problems associated with the use of objective lenses compared to lens-less holographic microscopes. In addition, SIM is expensive, has a complicated structure and is not easy to handle, and furthermore, the moire effect is difficult to apply to a transmission type microscope.

The present invention has been made in view of the above problems, and it is an object of the present invention to provide a holographic imaging device capable of realizing both a transmission type and a reflection type with a simple structure, and realizing a long working distance wide field of view or a ultra-high resolution, and also to provide a data processing method used therefor.

In order to attain the above-mentioned subject, the holographic imaging device of the present invention comprises:

a data acquisition unit for acquiring a hologram of an object light (O) emitted from an object illuminated with an illumination light (Q); and an image reconstruction unit for reconstructing an image of the object from the hologram acquired by the data acquiring unit, wherein the data acquisition unit comprises:

an optical system for generating the illumination light (Q), an in-line spherical wave reference light (L) being in-line with the object light (O), and an off-axis spherical wave reference light (R) being off-axis with the object light (O), from a coherent light emitted from a light source, and for propagating those lights and the object light (O), and further for changing an incident direction of the illumination light (Q) to the object;

a photo-detector for converting light intensity into an electric signal and outputting the electric signal; and a storing unit for acquiring and storing data of object light holograms ($I^j_{OR}$, j=1, ..., N), which are off-axis holograms of interference fringes between the off-axis spherical wave reference light (R) and the object lights ($O^j$, j=1, ..., N) emitted from the object illuminated, respectively, with the illumination lights ($Q^j$, j=1, ..., N) generated by the optical system as parallel lights having mutually different incident directions ($\theta^j$, j=1, ..., N) to the object, and data of a reference light hologram ($I_{LR}$), which is an off-axis hologram of interference fringes between the off-axis spherical wave reference light (R) and the in-line spherical wave reference light (L), using the photo-detector, wherein the image reconstruction unit comprises:

a light wave generation unit for generating object light wave holograms ($h^j(x, y)$, j=1, ..., N) at a position ($z=z_m$) of the object, which represent light waves of the object lights ($O^j$, j=1, ..., N) for the respective incident directions ($\theta^j$, j=1, ..., N), by using the data of the reference light hologram ($I_{LR}$) and the object light holograms ($I^j_{OR}$, j=1, ..., N);

a spectrum generation unit for generating object light spatial frequency spectra ($H^j(u,v)$, j=1, ..., N) by Fourier-transforming each of the object light wave holograms ($h^j(x, y)$, j=1, ..., N), respectively; and a spectrum synthesis unit for generating a synthetic object light spatial frequency spectrum ($H_T(u,v)$) enlarged so as to occupy a wider frequency space, by moving and arranging each of the object light spatial frequency spectra ($H^j(u,v)$, j=1, ..., N) in a two-dimensional space of a spatial frequency space (u,v) based on calculation of a cross correlation function so that each of those spectra overlaps with another over an area in which changes of amplitude and phase are common to the mutually overlapped spectra, and by making the object light spatial frequency spectra ($H^j(u,v)$, j=1, ..., N) match mutually in the overlap area using fitting coefficients ($a^{\alpha\beta}$, $\alpha \neq \beta$, $\alpha, \beta=1, ..., N$) obtained for adjusting mutual amplitude and phase of the object light spatial frequency spectra ($H^j(u,v)$, j=1, ..., N) having the overlap area mutually, wherein a synthetic object light wave hologram ($h_T(x,y)$) to be used for reconstruction of the image of the object is generated by inverse-Fourier transforming the synthetic object light spatial frequency spectrum ($H_T(u,v)$) generated by the spectrum synthesis unit.

Moreover, the data processing method of the present invention used for a holographic imaging device comprises the steps of:

acquiring data of a plurality of object light holograms ($I^j_{OR}$, j=1, ..., N), which are off-axis holograms of interference fringes between object lights ($O^j$, j=1, ..., N) emitted from an object sequentially illuminated with illumination lights ($Q^j$, j=1, ..., N) and an off-axis spherical wave reference light (R) being off-axis with respect to the object lights ($O^j$, j=1, ..., N), wherein the illumination lights ($Q^j$, j=1, ..., N) are composed of parallel lights with mutually different incident directions ($\theta^j$, j=1, ..., N) to the object and the data is acquired for each of the incident directions;

acquiring data of a reference light hologram ($I_{LR}$), which is an off-axis hologram of interference fringes between an in-line spherical wave reference light (L) being in-line with the object lights ($O^j$, j=1, ..., N) and the off-axis spherical wave reference light (R);

generating object light wave holograms ($h^j(x,y)$, j=1, ..., N), which represent light waves of the object lights ($O^j$, j=1, ..., N) at a position ($z=z_m$) of the object, by using the data of the reference light hologram ($I_{LR}$) and the object light holograms ($I^j_{OR}$, j=1, ..., N);

generating object light spatial frequency spectra ($H^j(u,v)$, j=1, ..., N) by Fourier-transforming each of the object light wave holograms ($h^j(x,y)$, j=1, ..., N), respectively;

generating a synthetic object light spatial frequency spectrum ($H_T(u,v)$) enlarged so as to occupy a wider frequency space, by moving and arranging each of the object light spatial frequency spectra ($H^j(u,v)$, j=1, ..., N) in a two-dimensional space of a spatial frequency space (u,v) based on calculation of a cross correlation function so that each of those spectra overlaps with another over an area in which changes of amplitude and phase are common to the mutually overlapped spectra, and by making the object light spatial frequency spectra ($H^j(u,v)$, j=1, ..., N) match mutually in the overlap area using fitting coefficients ($a^{\alpha\beta}$, $\alpha \neq \beta$, $\alpha, \beta=1, ..., N$) obtained for adjusting mutual amplitude and phase of the object light spatial frequency spectra ($H^j(u,v)$, j=1, ..., N) having the overlap area mutually; and generating a synthetic object light wave hologram ($h_T(x,y)$) used for reconstruction of the image of the object, by inverse-Fourier transforming the synthetic object light spatial frequency spectrum ($H_T(u,v)$).

According to the holographic imaging device of the present invention and the data processing method of the present invention used for the device, both the transmission type and the reflection type can be realized, and a long working distance wide field of view or an ultra-high resolution can be realized.

BRIEF DESCRIPTION OF THE DRAWINGS

FIG. 1 is a flow chart of the data processing method, used for the holographic imaging device, according to the 1st embodiment of the present invention.

FIG. 10 is a flow chart explaining a process of the phase adjustment using the phase of the head-on illumination light in the data processing method according to the 5th embodiment.

FIG. 11 is a side view showing the schematic constitution of the angle change unit of the transmission type holographic imaging device according to the 6th embodiment.

FIG. 12 is a schematic diagram showing arranged spatial frequency spectra in a spatial frequency space, which are generated from holograms data obtained using the device.

FIG. 13A is a side view showing the schematic constitution of the reflected type holographic imaging device according to the 7th embodiment, and FIG. 13B is a partial side view explaining the head-on illumination in the device.

FIG. 30A is an image of a synthetic spatial frequency spectrum formed by synthesizing spatial frequency spectra of object lights obtained by illuminating an object from 49-directions, FIG. 30B is an image of phase difference, of a synthetic object light with respect to the illumination light, obtained using the synthetic spatial frequency spectrum of FIG. 30A (practical example 1-3).

FIG. 31A is an image reconstructed from the synthetic spatial frequency spectrum shown in FIG. 30A, and FIG. 31B is an enlarged image of a part of FIG. 31A.

MODE FOR CARRYING OUT THE INVENTION

Hereinafter, a data processing method used in a holographic imaging device and a holographic imaging device according to an embodiment of the present invention are described with reference to the drawings.

The 1st Embodiment: Data Processing Method

Figure 2A:
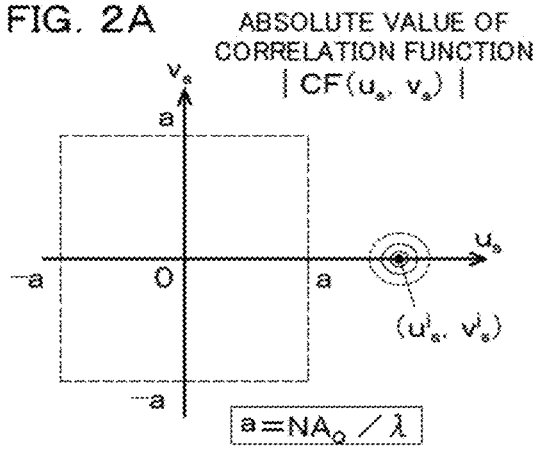
FIG. 2A and FIG. 2B are schematic diagrams of spatial frequency spectrum in a spatial frequency space for explaining processes from the cross correlation step to the synthetic step of FIG. 1.
Figure 2B:
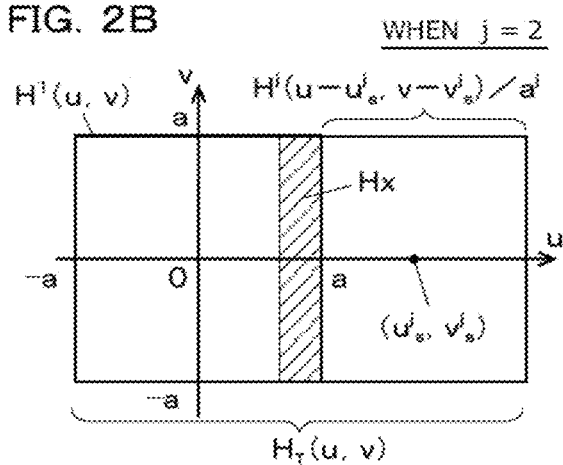
Figure 3:
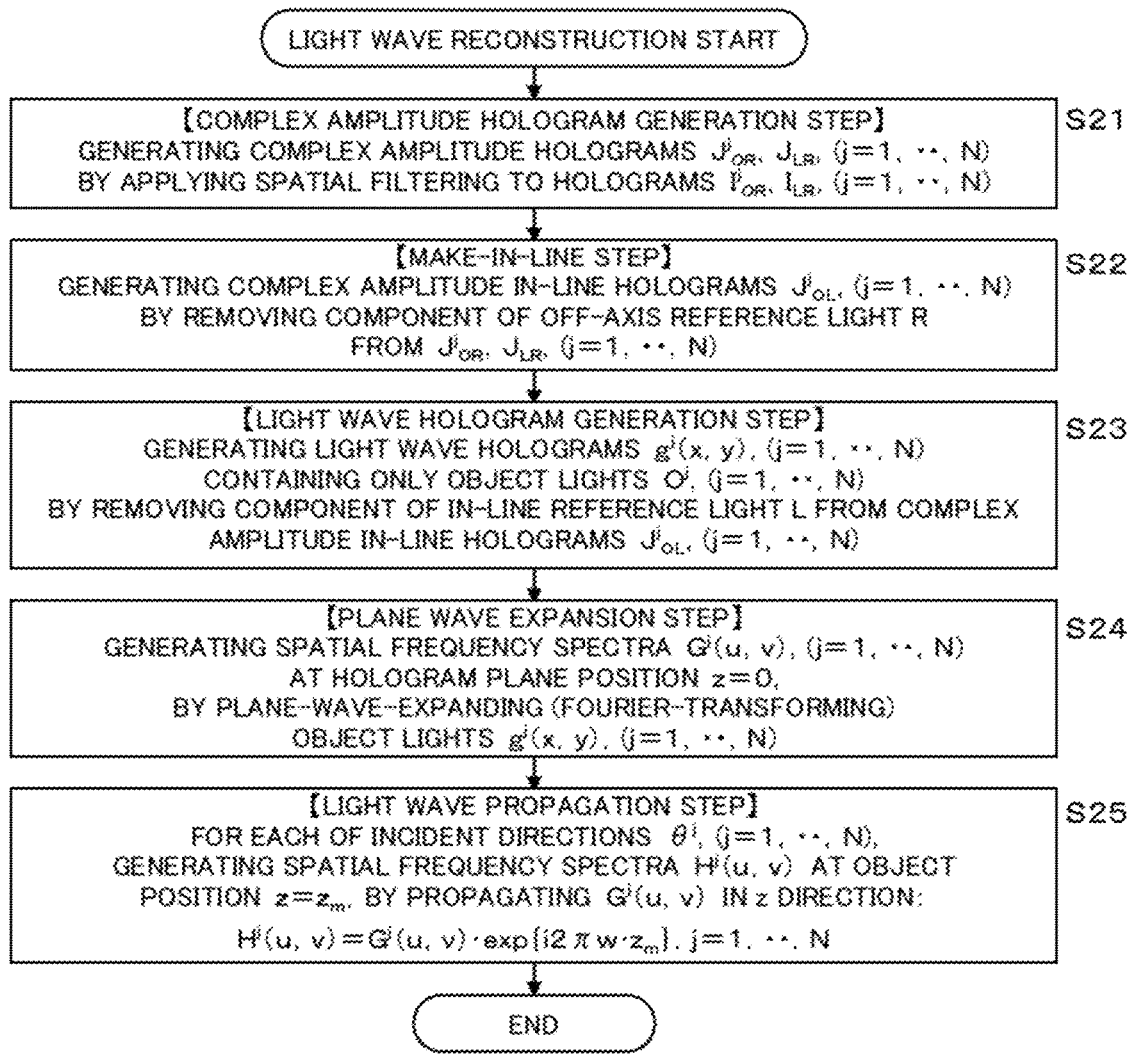
FIG. 3 is a flow chart which shows the details of the light wave reconstruction step of FIG. 1.

FIG. 1 to FIG. 3 show the data processing method according to the 1st embodiment. As shown in FIG. 1, this data processing method comprises a data acquisition step (S1), a light wave reconstruction step (S2), an initialization step (S3), three steps in an incident direction loop LPs and LPe, namely, a mutual cross correlation step (S4), a fitting coefficient derivation step (S5), a synthesis step (S6), and a step after the loop, namely, a synthetic light wave generation step (S7).

The present data processing method performs synthesis of hologram data using a principle that: when an object is illuminated with an obliquely incident parallel illumination light Q and an object light O emitted from the object is recorded as an object light off-axis hologram $I_{OR}$ using a reference light R, a spatial frequency spectrum H(u,v) of the object light O derived from the hologram $I_{OR}$ shifts in a spatial frequency space (u,v) according to an incident angle θ of the illumination light Q. The data processing method of the present embodiment realizes synthetic hologram to improve resolution by synthesizing a plurality of hologram data $I_{OR}$ in the spatial frequency space (u,v) so that the synthetic hologram data has a larger numerical aperture (synthetic numerical aperture $NA_S$) than a numerical aperture $NA_O$ of a single hologram data. Each process is described below.

In the data acquisition step (S1), the object is illuminated one by one with each of illumination lights $Q^j$, j=1, ..., N composed of parallel lights with different incident directions $θ^j$, j=1, ..., N and, for each incident direction, data of a plurality of object light holograms $I^j_{OR}$, j=1, ..., N, which are off-axis holograms of interference fringes between object lights $O^j$, j=1, ..., N emitted from the object and an off-axis spherical wave reference light (R) being off-axis with respect to the object lights $O^j$, j=1, ..., N, are acquired. And data of a reference light hologram $I_{LR}$, which is an off-axis hologram of interference fringes between an in-line spherical wave reference light L being in-line with the object lights $O^j$, j=1, ..., N and the off-axis spherical wave reference light R is acquired.

Here, a coordinate system describing the object and a hologram plane on which a hologram is formed are described. In digital holography, a hologram is formed at the position of a light receiving surface of an image pickup device such as a CCD, and the light receiving surface is the hologram plane. Therefore, the xy axes are set on the light receiving surface, the z axis is set to be the normal line of the light receiving surface, and an orthogonal coordinate system xyz having its origin at the center of the light receiving surface is set. The light receiving surface is z=0, and the position of the object, for example, the position of the surface of the object having a flat surface, is denoted z=$z_m$. This assumes that the light receiving surface and the object are optically face to face mutually. In the case where the light receiving surface and the object are optically opposed aslant, a rotation process based on the rotation angle between two surfaces may be added, if necessary.

In the light wave reconstruction step (S2), object light spatial frequency spectra $H^j(u,v)$, j=1, ..., N of the object lights $O^j$, j=1, ..., N are generated using the data of the reference light hologram $I_{LR}$ and the object light holograms $I^j_{OR}$, j=1, ..., N, for each incident direction. A more detailed explanation of the light wave reconstruction step (S2) is described later (FIG. 3).

In the initialization step (S3), the object spatial frequency spectrum $H^1(u,v)$ for j=1 is set to a synthetic spatial frequency spectrum $H_T(u,v)$, prior to the incident direction loop LPs, LPe in which processing of synthesizing the object light spatial frequency spectra $H^j(u,v)$, j=1, ..., N is performed. Here, in the case of j=1, an incident direction $θ^1$=0 and head-on illumination is assumed, namely, the object is illuminated with a parallel illumination light $Q^1$ from the front. The parallel illumination light is an illumination light of parallel light.

In the next series of incident direction loop LPs, LPe, each of the object light spatial frequency spectra $H^j(u,v)$, j=1, ..., N is moved by shifting with a predetermined shift amount and arranged in a two dimensional spatial frequency space (u,v) so that an overlap area is made in which changes of amplitude and phase are common to the overlapped spectra, and in the overlap area mutual amplitude and phase of each spectrum $H^j$ are adjusted so as to match mutually, and thus a synthetic object light spatial frequency spectrum ($H_T(u,v)$) enlarged so as to occupy a wider frequency space is generated. Conversely, each of the object light holograms $I^j_{OR}$, j=1, ..., N is acquired by setting the incident direction $θ^j$ of each illumination light so that such an overlap area exists.

The cross correlation step (S4) is the first step of the incident direction loop LPs, LPe, wherein the loop is sequentially performed for each of the changing parameter j identifying the incident direction $θ^j$ of the illumination light from 2 to N. In the cross correlation step (S4), a cross correlation function $CF(u_s, v_s)$ between the synthetic spatial frequency spectrum $H_T(u,v)$ and the object light spatial frequency spectrum $H^j(u,v)$ is calculated as shown in following equation (1). The calculation of the cross correlation function $CF(u_s, v_s)$ by equation (1) is a convolution calculation. Therefore, the cross correlation function $CF(u_s, v_s)$ can be calculated by Fourier transforming the product $h_T(x,y) \cdot h^{j*}(x,y)$, which is a product of each object light hologram corresponds to each of spectra $H_T^*(u,v)$ and $H^j(u,v)$.

$$CF(u_s, v_s) = \{H_T^* \otimes H^j\}(u_s, v_s) \quad (1)$$
$$= \int\int H_T^*(u, v) \cdot H^j(u - u_s, v - v_s) du dv$$

As shown in FIG. 2A, the shift amount ($u^j_s, v^j_s$) is detected as the coordinates of the point at which the absolute value of the cross correlation function $CF(u_s, v_s)$ is the maximum value in the space ($u_s, v_s$). At the position of the point ($u^j_s, v^j_s$), the peak of the absolute value $|CF(u_s, v_s)|$ appears. In this example, the peak point ($u^j_s, v^j_s$) appears on the $u_s$ axis, but the peak may appear at an arbitrary position according to the condition at the time the object light hologram $I_{OR}$ is acquired. The absolute value of the cross correlation function $CF(u_s, v_s)$ is an index used when two areas are overlapped, the index shows that the changes of amplitude and phase of the two functions are common in the areas. A spectrum $H^j(u-u^j_s, v-v^j_s)$ derived by translating the spectrum $H^j(u,v)$ by the shift amount $(u^j_s, v^j_s)$ falls in an arrangement in which the common area is placed onto $H_T(u,v)$. The area surrounded by $\pm a = \pm NA_O/\lambda$ on the uv axes in the figure indicates the spatial frequency band possibly occupied by the object light O received by the square photo-detector, for example, a CCD. This spatial frequency band is determined by the numerical aperture $NA_O$ of the photo-detector to the object light and the light wavelength $\lambda$.

In the next step in the cross correlation step (S4), one of fitting coefficients $a^{\alpha\beta}$, $\alpha \neq \beta$, $\alpha, \beta = 1, \ldots, N$ is derived, which are used for adjusting mutual amplitudes and phases of the object light spatial frequency spectra $H^j(u,v)$, $j=1, \ldots, N$ forming the common overlap areas, and the amplitude and the phase in the overlap areas are matched with each other by using the fitting coefficient $a^{\alpha\beta}$. More specifically, for pair spectra $H^\alpha$, $H^\beta$, $\alpha \neq \beta$ made of two of the object light spatial frequency spectra $H^j(u,v)$, $j=1, \ldots, N$ mutually forming the overlapping areas, one of the fitting coefficients $a^{\alpha\beta}$, $\alpha \neq \beta$, $\alpha, \beta = 1, \ldots, N$ is obtained as an average value of ratios of the spectral values at the points (u,v) included in the overlapping area common to each other, and the amplitude value and the phase value of each point of one of the pair spectra $H^\alpha$, $H^\beta$ are adjusted so as to match the one to the other of the pair spectra $H^\alpha$, $H^\beta$.

In the fitting coefficient derivation step (S5) of the present embodiment, a fitting coefficient $a^j$ for matching the amplitude and phase of the spectrum $H^j(u-u^j_s, v-v^j_s)$ to those of the spectrum $H_T(u,v)$ is derived. The fitting coefficient $a^j$ is calculated as the average value of the ratio of $H^j(u-u^j_s, v-v^j_s)$ to $H_T(u,v)$ at each point (u,v) in the overlap area. That is, when the average operation is represented by $<>$, it becomes that the fitting coefficient $a^j = <H^j(u-u^j_s, v-v^j_s)/H_T(u,v)>$. Thus, the adjusted spectrum $H^j(u-u^j_s, v-v^j_s)/a^j$ is derived. By setting the fitting coefficient $a^j$ as the average value of many ratios, it is possible to eliminate the influence of abnormal values due to noise or the like.

In the synthesis step (S6), a new synthetic spatial frequency spectrum $H_T(u, v)$ is generated by combining $H_T(u, v)$ and $H^j(u-u^j_s, v-v^j_s)/a^j$. Here, the synthesis is a process for obtaining a union of a set of constituent points of $H^T(u,v)$ and a set of constituent points of $H^j(u-u^j_s, v-v^j_s)/a^j$ other than the points in the common area.

FIG. 2B shows the way how a new synthetic object light spatial frequency spectrum $H_T(u,v)$ is set in the spatial frequency space (u,v), namely, in the case of j=2, the spectrum $H^2$ of j=2 is moved and arranged around the spectrum $H^1$ and combined with each other via the overlap area Hx to set the new synthetic spectrum $H_T(u,v)$. The new $H_T(u,v)$ is used to calculate the cross correlation function with the next spectrum $H^3(u,v)$ of j=3.

After the loop processing described above is completed, a synthetic object light spatial frequency spectrum $H_T(u,v)$ is obtained as a result of mutual synthesis of each object light spatial frequency spectrum $H^j(u,v)$, $j=1, \ldots, N$, and in the spectrum $H_T(u,v)$, the amplitude and phase of each of the spectra $H^j(u,v)$, $j=2, \ldots, N$ are adjusted to the amplitude and the phase of the spectrum $H^1(u,v)$ of j=1 in the case of head-on illumination. The synthetic object light spatial frequency spectrum $H_T(u,v)$ becomes a spectrum having a larger numerical aperture compared to the numerical aperture of a single spectrum case, because the spatial frequency band is expanded.

In the synthetic light wave generation step (S7), a synthetic object light wave hologram $h_T(x,y)$, to be used for reconstructing the object image, is generated by inverse-Fourier transforming the synthetic object light spatial frequency spectrum $H_T(u,v)$. That is, when the operation of the inverse-Fourier transform of * is expressed by the notation $F^{-1}(*)$, it becomes that the synthetic object light wave hologram $h_T(x,y) = F^{-1}(H_T(u,v))$. A high resolution image can be reconstructed by the synthetic object light wave hologram $h_T(x,y)$.

Next, with reference to FIG. 3, the light wave reconstruction step (S2) is described. The light wave reconstruction step (S2) comprises a complex amplitude hologram generating step (S21), an make-in-line step (S22), a light wave hologram generating step (S23), a plane wave expansion step (S24), and a light wave propagating step (S25). After showing the outline below, the details of hologram data and its processing are described using mathematical equations.

In the complex amplitude hologram generating step (S21), complex amplitude holograms $J^j_{OR}$, $j=1, \ldots, N$, $J_{LR}$ are generated by applying spatial frequency filtering to the holograms $I^j_{OR}$, $j=1, \ldots, N$, $I_{LR}$.

In the make-in-line step (S22), the components of the off-axis reference light R are removed from the complex amplitude holograms $J^j_{OR}$ and $J_{LR}$, $j=1, \ldots, N$, and the complex amplitude in-line holograms $J^j_{OL}$, $j=1, \ldots, N$ are generated.

In the light wave hologram generating step (S23), the components of the in-line reference light L are removed from the complex amplitude in-line holograms $J^j_{OL}$, $j=1, \ldots, N$, and object light wave holograms $g^j(x,y)$, $j=1, \ldots, N$ of only the object light $O^j$, $j=1, \ldots, N$ are generated.

In the plane wave expansion step (S24), spatial frequency spectrum $G^j(u,v)$, $j=1, \ldots, N$ at the position z=0 on a hologram plane are generated by performing a plane wave expansion (Fourier transform) of the object light wave holograms $g^j(x,y)$, $j=1, \ldots, N$.

In the light wave propagation step (S25), the spatial frequency spectra $G^j(u, v)$, $j=1, \ldots, N$ are propagated in the z direction and the spatial frequency spectra $H^j(u, v)$, $j=1, \ldots, N$ at the position $z=z_m$ are generated. The propagation of the light waves can be performed using a wavenumber w in the z direction, namely, $H^j(u,v) = G^j(u,v) \cdot \exp\{i2\pi w \cdot z_m\}$.

(Hologram Data and its Processing)

Hologram data and its processing based on mathematical equations are described. The hologram involves the off-axis reference light R, the in-line spherical wave reference light L, the object light O, and the like. Here, the xyz right-handed orthogonal coordinate system is set at the center of the hologram plane (light receiving surface of the photo-detector). The object light O(x,y,t), the off-axis reference light R(x,y,t), and the in-line spherical wave reference light L(x,y,t) are denoted using position coordinates (x,y), respectively, in the general form by following equations (2), (3) and (4). Those lights are mutually coherent lights of angular frequency ω. The coefficients, arguments, subscripts, etc. in each equation are interpreted as general expressions and meanings. In each of following equations, explicit designation of position coordinates (x,y,z) and spatial frequencies (u,v,w) and the like are appropriately omitted.

$$O(x,y,t) = O_0(x,y)\exp[i(\phi_O(x,y) - \omega t)] \quad (2)$$

$$R(x,y,t) = R_0(x,y)\exp[i(\phi_R(x,y) - \omega t)] \quad (3)$$

$$L(x,y,t) = L_0(x,y)\exp[i(\phi_L(x,y) - \omega t)] \quad (4)$$

The light intensity $I_{OR}(x,y)$ of a light composed of L(x,y,t) and R(x,y,t), and the light intensity $I_{LR}(x,y)$ of a light composed of O(x,y,t) and R(x,y,t) are expressed by following equations (5) and (6), respectively. Those light intensities $I_{OR}$ and $I_{LR}$ are acquired as hologram data through a photo-detector.

$$I_{OR}(x,y)=O_0^2+R_0^2+O_0R_0\exp[i(\phi_O-\phi_R)]+O_0R_0\exp[-i(\phi_O-\phi_R)] \quad (5)$$

$$I_{LR}(x,y)=L_0^2+R_0^2+L_0R_0\exp[i(\phi_L-\phi_R)]+L_0R_0\exp[-i(\phi_L-\phi_R)] \quad (6)$$

On the right-hand side of above equations (5) and (6), the 1st term is the light intensity component of the object light O or the in-line spherical wave reference light L, and the 2nd term is the light intensity component of the off-axis reference light R. The 3rd and 4th terms of each equation are respectively a direct image component and a conjugate image component, which are produced via modulation of the object light O or the in-line spherical wave reference light L with the off-axis reference light R.

In addition, the direct image component of the 3rd term is a term including necessary information of the objective light O or the reference light L, namely, $O_0\exp(i\phi_O)$ or $L_0\exp(\phi_L)$ in the above equations (2) or (4), respectively. In the 3rd term of direct image component, the phase portion $[i\phi_O]$ or $[i\phi_L]$ of the object light O or the reference light L is equal to the phase portion $[i\phi_O]$ or $[i\phi_L]$ in above equation (2) or (4) defining those light. On the other hand, in the 4th term, the phase portion $[-i\phi_O]$ or $[-i\phi_L]$ of the object light O or the reference light L is a complex conjugate of the phase portion $[i\phi_O]$ or $[i\phi_L]$ in above equation (2) or (4) defining those light, and accordingly, the 4th term is called a conjugate image component.

By using the off-axis reference light R and because of its off-axis effect, such a hologram can be acquired in which the direct image component (the 3rd term) is separated from the light intensity components (the 1st and 2nd terms) and the conjugate image component (the 4th term) when the hologram is expressed in the spatial frequency space. Therefore, by applying spatial frequency filtering, only the 3rd terms of above equations (5) and (6) are extracted, and an object light complex amplitude hologram $J_{OR}$ in which the object light O is recorded and a complex amplitude hologram $J_{LR}$ in which the in-line spherical wave reference light L is recorded are derived, respectively, as shown in following equations (7) and (8). Those complex amplitude holograms are holograms still containing the components of off-axis reference light R.

$$J_{OR}(x,y)=O_0(x,y)R_0(x,y)\exp[i(\phi_O(x,y)-\phi_R(x,y))] \quad (7)$$

$$J_{LR}(x,y)=L_0(x,y)R_0(x,y)\exp[i(\phi_L(x,y)-\phi_R(x,y))] \quad (8)$$

Spatial frequency filtering is performed by Fourier transforming equations (5) and (6) to equations expressed in a spatial frequency space, filtering using bandpass filter, and then inverse-Fourier transforming. For reference, if the pixels in the photo-detector are two-dimensionally arranged with a pixel pitch d, the highest spatial frequency fs of the hologram, recordable by using such a photo-detector, becomes a spatial frequency fs=1/d.

By dividing above equation (7) by equation (8), the amplitude $R_0$ and the phase $\phi_R$ of the off-axis reference light R can be removed from the equation (7). This process is of subtracting the phase, that is, a process of performing frequency conversion, and is a process of heterodyne modulation. As a result, a complex amplitude in-line hologram $J_{OL}$ of the object light O with respect to the in-line spherical wave reference light L is obtained as shown in following equation (9).

$$J_{OL}(x,y)=(O_0(x,y)/L_0(x,y))\exp[i(\phi_O(x,y)-\phi_L(x,y))] \quad (9)$$

In the data processing method used for the holographic imaging device, data of object light holograms $I^j_{OR}$, j=1, . . . , N are acquired using illumination lights $Q^j$, j=1, . . . , N of changed incident directions $\theta^j$, j=1, . . . , N to an object, even though in those case, the processing of above equation (9) can be performed using the hologram $I_{LR}$ common to those holograms $I^j_{OR}$. This means, with respect to the in-line spherical wave reference light L, it is sufficient to record the light L on one off-axis hologram $I_{LR}$ and derive one complex amplitude hologram $J_{LR}$.

By multiplying equation (9) by $L_0(x,y)\exp(i(\varphi(x,y))$, the component of the in-line spherical wave reference light L can be removed from equation (9), and a hologram containing only a light wave of the object light O is obtained. The term of this "hologram" is used in a sense that it contains all the data necessary for reconstructing light waves. The amplitude $L_0(x,y)$ of the in-line spherical wave reference light L, if it can be regarded as a constant value, it may be left without removing. Since the reference light L is a spherical wave, the phase component $\exp(i(\varphi(x,y))$ can be easily obtained in a functional expression, only by obtaining the position of the focal point of the light L with respect to the photo-detector.

The in-line spherical wave reference light L is a reference light for acquiring and storing data of the reference light R as a reference light hologram $I_{LR}$ being an off-axis hologram, and also functions as a reference light in digital processing of hologram data. The in-line spherical wave reference light L is used for generating a complex amplitude in-line hologram $J_{OL}$ which is a hologram not including the data of the reference light R. The in-line spherical wave reference light L can be expressed in a mathematical equation by determining the position of the focal point and the wavelength or the frequency according to its characteristic as a spherical wave, and can be used for digital processing.

Information on the position of the focal point of the in-line spherical wave reference light L (distance from the hologram plane) is obtained by illuminating an object, such as a scale plate having a known dimension pattern, with the in-line spherical wave reference light L as illumination light and obtaining an image of its scale as a hologram $I_{SR}$. When reconstructing the image of the scale plate from the hologram $I_{SR}$, the distance from the hologram plane to the focal point of the reference light L is used as a parameter. The value of the parameter that the reconstructed image can be reconstructed to the full size is the distance to the focal point of the reference light L. The size of the reconstructed image on the image reconstructing plane can be measured by the known pixel pitch of the photo-detector (for example, CCD).

By multiplying equation (9) by $L_0(x,y)\exp(i(\varphi_L(x,y))$, amplitude modulation by the amplitude factor $L_0(x,y)$ and heterodyne modulation by the phase factor $\exp(i((\varphi_L(x,y))$ are performed, and a light wave hologram g(x,y) representing the light wave of the object light O on the surface (hologram plane, xy plane, or plane z=0) of the photo-detector is obtained as shown in following equation (10). The step for generating the light wave hologram g(x,y) is a step for reconstructing the object light O. It is possible to display the object light O as an image by displaying the square of the absolute value $|g(x,y)|^2$ of the light wave hologram g(x,y) on the display and the object light O can be seen as a picture.

$$g(x,y)=O_0(x,y)\exp[i(\phi_O(x,y)]\quad(10)$$

(Plane Wave Expansion of the Object Light)

The plane wave is one of the exact solutions of the Helmholtz equation on electromagnetic waves. A light wave of the object light O can be expanded using the plane waves which are the exact solution. This plane wave expansion is executed by performing Fourier transformation on the light wave hologram g(x,y) of above equation (10). That is, Fourier transform is plane wave expansion. As a result of the plane wave expansion, the spatial frequency spectrum G(u,v) for the object light O is obtained as shown in following equation (11). The spatial frequency spectrum G(u,v) is the complex amplitude of the plane wave having the wave number vector (u,v) and is also called the complex amplitude G(u,v).

$$G(u,v)=\iint g(x,y)\exp[-i2\pi(ux+vy)]dxdy\quad(11)$$

In above equation (11), u and v are Fourier space frequencies in x direction and y direction, respectively. The Fourier space frequency w in z direction can be obtained from the dispersion equation of the plane wave (relational equation of wave number and wavelength) as shown in following equation (12). The dispersion equation contains the refractive index n in a form $(n/\lambda)^2$. Following equation (12) shows the case of n=1, and $\lambda$ is the optical wavelength.

$$w(u,v)=\sqrt{1/\lambda^2-u^2-v^2}\quad(12)$$

(Numerical Aperture and Synthetic Numerical Aperture)

Here, increase of resolution of the holographic imaging device based on light wave synthesis is described. When a parallel illumination light of wavelength $\lambda$ of vertical incidence, that is, incident angle $\theta_i$=0, is incident on a diffraction fringe of interval d, the relation between the diffraction angle $\theta_r$, the wavelength $\lambda$, and the interval d is given as following equation (13). The spatial frequency u of the diffraction fringes is given as following equation (14). When the diffracted light is recorded by a square photo-detector having a numerical aperture of $NA_O$, the spatial frequency band of recordable diffraction fringes is expressed by following equation (15). The theoretical resolution $\delta$ for this spatial frequency bandwidth is given by following equation (16).

$$d=\frac{\lambda}{\sin\theta_r}\quad(13)$$

$$u=\frac{1}{d}=\frac{\sin\theta_r}{\lambda}\quad(14)$$

$$-\frac{NA_O}{\lambda}<u<\frac{NA_O}{\lambda}\quad(15)$$

$$\delta=\frac{\lambda}{2NA_O}\quad(16)$$

Since the numerical aperture of the photo-detector is $NA_O$<1, the optical resolution limit is $\lambda/2$. This represents the resolution limit when a propagating object light is recorded as a hologram having a numerical aperture $NA_O$.

In the case of an oblique parallel illumination light of incident angle $\theta_i$, the relation of above equation (13) becomes following equation (17). Since the spatial frequency u of the diffraction fringes is given by following equation (18), in the case of recording with a square photo-detector having a numerical aperture $NA_O$, the spatial frequency band of recordable diffraction fringe can be expressed by following equation (19), and the spatial frequency band is shifted due to the oblique incidence of the oblique parallel illumination light. When the incident angle $\theta_i$ of the illumination light is changed within the range of $-NA_Q<\sin\theta_i<NA_Q$, the spatial frequency band of recordable diffraction fringes can be expanded to the range of following equation (20).

$$d=\frac{\lambda}{\sin\theta_i+\sin\theta_r}\quad(17)$$

$$u=\frac{1}{d}=\frac{\sin\theta_i+\sin\theta_r}{\lambda}\quad(18)$$

$$\frac{\sin\theta_i-NA_O}{\lambda}<u<\frac{\sin\theta_i+NA_O}{\lambda}\quad(19)$$

$$\frac{-NA_Q-NA_O}{\lambda}<u<\frac{NA_Q+NA_O}{\lambda}\quad(20)$$

In the case of the vertical illumination with an incident angle $\theta_i$=0, the waves, whose spatial frequency u is $-(1/\lambda)$ or less, or $(1/\lambda)$ or more, generated in the diffraction fringes are evanescent waves which can not propagate anymore. In the case of oblique illumination, a part of those evanescent waves change to waves that can propagate due to the oblique illumination. The numerical aperture $NA_Q+NA_O$ in equation (20) represents that the numerical aperture is enlarged by the incident angle change due to the illumination light. Since the numerical aperture is $NA_O$<1 and $NA_Q$<1, if the object light is recorded while changing the direction of the illumination light, the numerical aperture $NA_S=NA_Q+NA_O$ can be increased up to 2 at the maximum. Also, the maximum spatial frequency band that can be recorded is given by following equation (21).

$$\frac{-2}{\lambda}<u<\frac{2}{\lambda}\quad(21)$$

The 2nd Embodiment: Transmission Type Long Working Distance Wide Field of View Imaging Device With reference to FIG. 4 to FIG. 7, a transmission type holographic imaging device 1 according to the 2nd embodiment is described. The holographic imaging device 1 is a device that uses the data processing method of the 1st embodiment and has a long working distance and can realize wide field of view imaging.

Figure 4A:
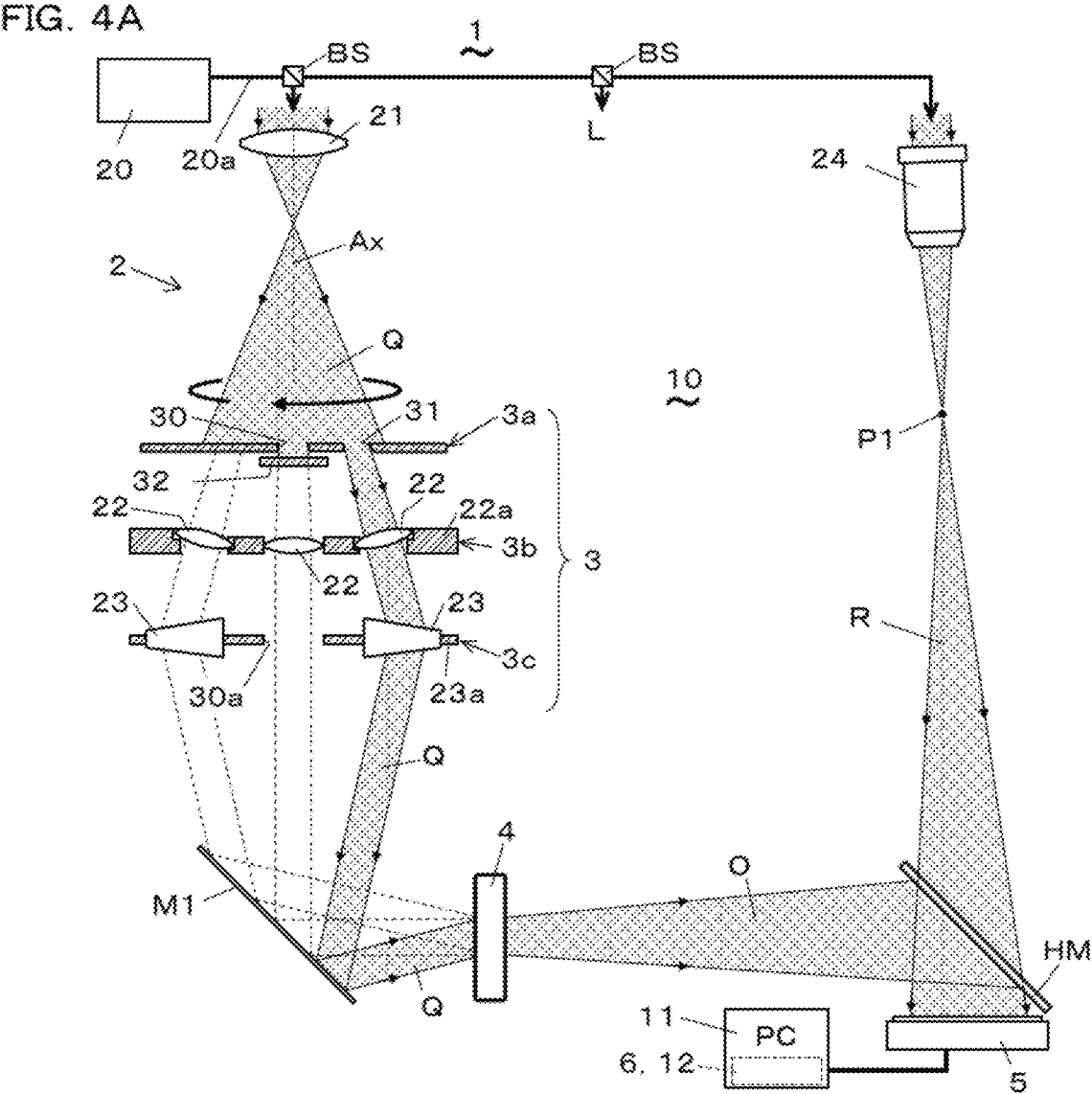
FIG. 4A is a side view showing the schematic constitution of the transmission type holographic imaging device according to the 2nd embodiment.
Figure 4B:
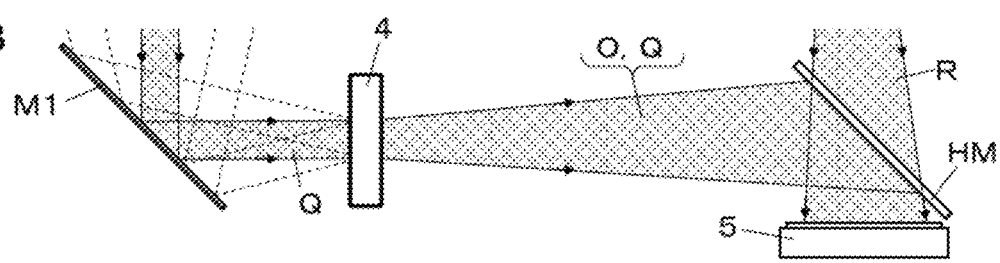
FIG. 4B is a partial side view explaining a head-on illumination in the device.
Figure 4C:
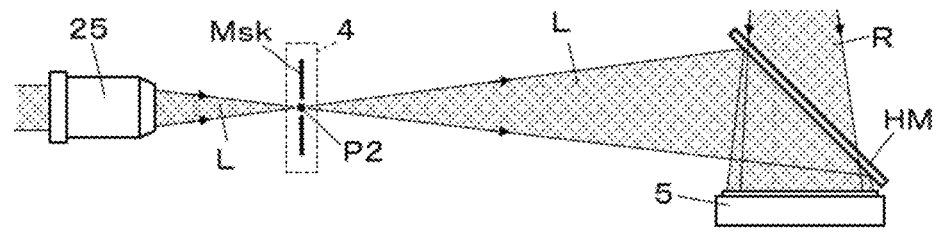
FIG. 4C is a partial side view explaining the reference light hologram recording in the device.

As shown in FIG. 4A to FIG. 4C, the holographic imaging device 1 comprises a data acquisition unit 10 for acquiring holograms of the object light O emitted from a translucent object 4 illuminated with the illumination light Q, and an image reconstruction unit 12 that reconstructs images of the object 4 from the holograms obtained by the data acquisition unit 10. The data acquisition unit 10 comprises an optical system 2 for shaping and propagating light, a photo detector 5 for converting light intensity into an electric signal and outputting the electric signal, and a storing unit for acquiring and storing data of off-axis holograms using the photo-detector 5. The holographic imaging device 1 is controlled by a control unit 11 including a computer, and the storing unit 6 and the image reconstruction unit 12 are provided in the control unit 11. Each part is described below.

The optical system 2 generates, from a coherent light 20a emitted by a light source 20, the illumination light Q, the in-line spherical wave reference light L being in-line with respect to the object light O, and the off-axis spherical wave reference light R, and propagates those lights and the object light O. The optical system 2 includes beam splitters BS and thereby splits the coherent light 20a into lights for generating the illumination light Q, the in-line spherical wave reference light L, and the off-axis spherical wave reference light R. Further, the optical system 2 includes an angle change unit 3 that changes the incident direction of the illumination light Q to the object 4.

Here, an optical axis Ax of the illumination light is defined by an optical central axis of the photo-detector 5, which goes to the center of the photo-detector 5. The optical axis Ax coincides with the z axis defined on the hologram plane. The optical system 2 for the illumination light Q includes a lens 21 for expanding the coherent light 20a in a cone shape along the optical axis Ax, the angle change unit 3, a reflecting mirror M1 arranged at 45°, and a half mirror HM arranged at 45°. The translucent object 4 is disposed between the reflecting mirror M1 and the half mirror HM. The half mirror HM faces the photo-detector 5 at an angle of 45°. The light, expanded into a cone shape by the lens 21, is incident on the angle change unit 3.

Figure 5A:
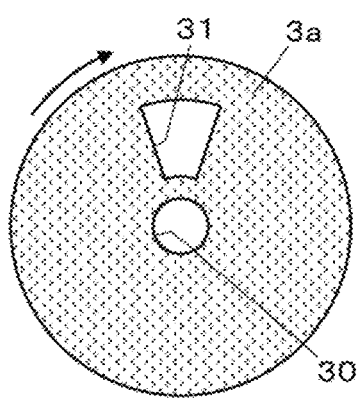
FIG. 5A is a plan view of a rotating plate, for distributing the illumination light, of the angle change unit of the device.
Figure 5B:
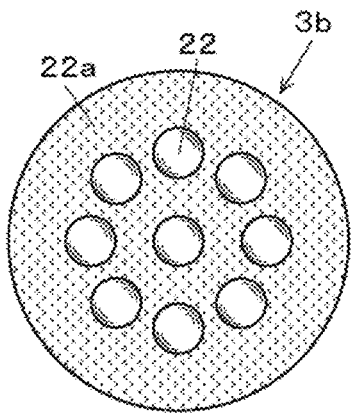
FIG. 5B is a plan view of the lens assembly of the angle change unit.
Figure 5C:
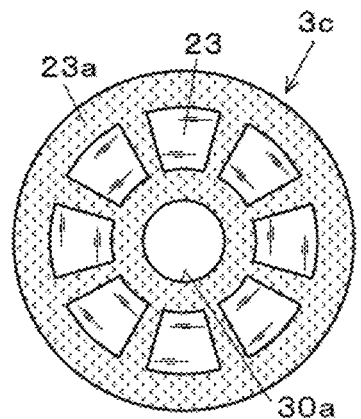
FIG. 5C is a plan view of a deflecting element assembly of the angle change unit.

The angle change unit 3 includes a rotating plate 3a, a lens assembly 3b, and a deflecting element assembly 3c as constituent components (see FIG. 5A to FIG. 5C). The rotating plate 3a, the lens assembly 3b, and the deflection element assembly 3c have the optical axis Ax of the illumination light as a common central axis. The rotating plate 3a is rotatable around the optical axis Ax. The lens assembly 3b and the deflection element assembly 3c are fixed to the holographic imaging device 1. The rotary plate 3a has a circular center opening 30 having a shutter 32 and an eccentric opening 31 provided at an eccentric position, receives the light diverging in the cone shape, intermittently rotates around the optical axis Ax, and distributes a part of the light diverging in the cone shape as the illumination light Q. By opening the shutter 32, the illumination light $Q^j$, j=1 for illuminating the object 4 from the front is radiated from the center opening 30. In the case of this head-on illumination, the shutter 32 is used to close the eccentric opening 31.

The lens assembly 3b includes a plurality of lenses 22 arranged around the optical axis Ax for converting each of the lights distributed by the rotating plate 3a into a parallel light, a plurality of lenses 22 arranged around the optical axis Ax, and a lens 22 arranged on the optical axis Ax. Each lens 22 is fixed to the support plate 22a. The deflection element assembly 3c has prisms 23, each of which changes the direction of the parallel light so that each of the parallel lights from the lens assembly 3b passes through one point on the optical axis Ax of the illumination light. Each prism 23 is fixed to a support plate 23a so as to be disposed around the optical axis Ax. The support plate 23a has a center opening 30a for transmitting the head-on illumination light.

In the angle change unit 3 of the present embodiment, the lens assembly 3b has eight lenses 22 arranged circumferentially, and the deflecting element assembly 3c has eight prisms 23 arranged circumferentially so that each of the prisms 23 corresponds, respectively, to each of the lenses 22 arranged circumferentially in the lens assembly 3b. The rotating plate 3a intermittently rotates and the eccentric opening 31 is stopped at every position corresponding to one of the lenses 22, arranged circumferentially, of the lens assembly 3b. The lens 22 and the prism 23, which are paired mutually and on coaxial circumferences respectively, receives the light from the eccentric opening 31 generates each of the illumination lights $Q^j$, j=2, ..., 9 composed of parallel light intersecting the optical axis Ax at a predetermined angle. In the present embodiment, the number of pairs of lens 22 and prism 23 is eight, but the number is not limited to eight, and may be any number of pairs. In addition, the deflection element assembly 3c may be provided with diffraction gratings instead of the prisms 23.

The reflecting mirror M1 after the angle change unit 3 bends the optical axis Ax of the illumination light at right angles and directs it toward the object 4. The illumination lights $Q^j$, j=1, ..., 9 generated through the angle change unit 3 passes through one point on the optical axis Ax of the illumination light at the position of the object 4. That is, the illumination light $Q^j$, j=1, ..., 9 have a focal point at the position of the object 4.

The optical system for the off-axis spherical wave reference light R has a condenser lens 24 for generating a spherical wave from the coherent light 20a. The light that has passed through the condenser lens 24 forms a focal point P1 and then diverges and passes through the half mirror HM in front of the photo-detector 5 to enter the photo-detector 5. The optical axis of the condenser lens 24 is inclined with respect to the normal line of the photo-detector 5 in order to make the reference light R off-axis.

The optical system for the in-line spherical wave reference light L has a condenser lens 25 for generating a spherical wave from the coherent light 20a. The optical axis of the condenser lens 25 coincides with the optical axis Ax of the illumination light, in other words, coincides with the optical center axis toward the center of the photo-detector 5. The light having passed through the condenser lens 25 forms a focal point P2 at the position where the object 4 is arranged and then diverges and is reflected by the half mirror HM in front of the photo-detector 5 to be incident on the photo-detector 5.

The in-line spherical wave reference light L is intended to be analytically expressed and used for data processing. In order to analytically express the spherical wave, it is sufficient if the wavelength of the spherical wave and the center position of the spherical wave are known. Conversely, the in-line spherical wave reference light L itself should be generated as an undistorted spherical wave so as to be adequate for analytical data processing. Then, the optical system for the in-line spherical wave reference light L is provided with a mask Msk having a pinhole at the position of the focal point P2, thereby generating the in-line spherical wave reference light L as a spherical wave without distortion or noise.

Since the focal point P2 lies on the optical axis Ax of the illumination light, the in-line spherical wave reference light L is in-line with the object light O when the object light hologram and the reference light hologram are superimposed on each other. In addition, the off-axis spherical wave reference light R is set to have an off-axis relationship with respect to the object light O, and likewise has an off-axis relation to the in-line spherical wave reference light L. In addition, the focal points P1 and P2 are set so as to be optically close to each other. With this setting, the spatial frequency band of the reference light hologram $I_{LR}$ can be narrowed.

In the optical system 2 of the holographic imaging device 1 of the present embodiment, the numerical aperture $NA_O$ of the photo-detector 5 with respect to the object lights $O^j$, j=1, ..., N has a value close to zero. In the holographic imaging device 1, the synthetic object light spatial frequency spectrum $H_T(u,v)$ is generated using data of a large number of object light holograms $I^j_{OR}$, j=1, ..., N, and therefore the synthetic numerical aperture determined by the frequency spectrum $H_T(u,v)$ approaches 1. In this optical system, the distance from the photo-detector 5 to the subject (object 4) can be made large, and a large size object can be imaged.

Next, the operation of the holographic imaging device 1 is described. Illumination lights $Q^j$, j=1, . . . , 9 which are parallel lights having mutually different incident directions $\theta^j$, j=1, . . . , 9 are generated using the angle change unit 3 of the optical system 2. By illuminating the translucent object 4 with the illumination lights $Q^j$, j=1, . . . , 9 for each incident direction, the data of the object light holograms $I^j_{OR}$, j=1, . . . , 9, each of which is an off-axis hologram of interference fringes between each of the object lights $O^j$, j=1, . . . , 9 emitted from the object 4 and the off-axis spherical wave reference light R, are obtained using the photo-detector 5 and stored in the storing unit 6.

The object light hologram $I^j_{OR}$, only in the case of head-on illumination with j=1, has information on the illumination light Q that has passed through the object 4. In the case of the other oblique illumination light $Q^j$, j=2, . . . 9, the illumination light Q does not enter the photo-detector 5, so the object light hologram $I^j_{OR}$ does not include the information on the illumination light Q.

The data of the reference light hologram $I_{LR}$ is obtained as an off-axis hologram of interference fringes between the in-line spherical wave reference light L and the off-axis spherical wave reference light R using the photo-detector 5 and stored in the storing unit 6. The reference light hologram $I_{LR}$ records and saves the data of the off-axis spherical wave reference light R. The reference light hologram $I_{LR}$ is used for removing the component of the off-axis spherical wave reference light R from the object light complex amplitude hologram $J^j_{OR}$. Therefore, as far as the off-axis spherical wave reference light R at the time of acquiring the object light hologram $I^j_{OR}$ is kept under constant condition, it is sufficient if only one reference light hologram $I_{LR}$ by the off-axis spherical wave reference light R is provided.

Figure 6A:
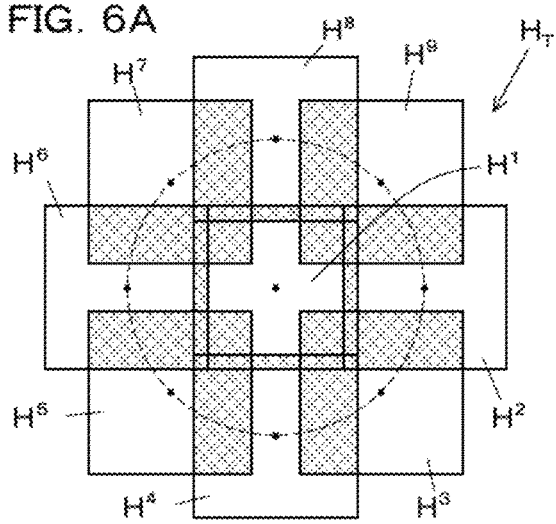
FIG. 6A is a schematic diagram showing arranged spatial frequency spectra in a spatial frequency space, which are generated from holograms data obtained using the device.
Figure 6B:
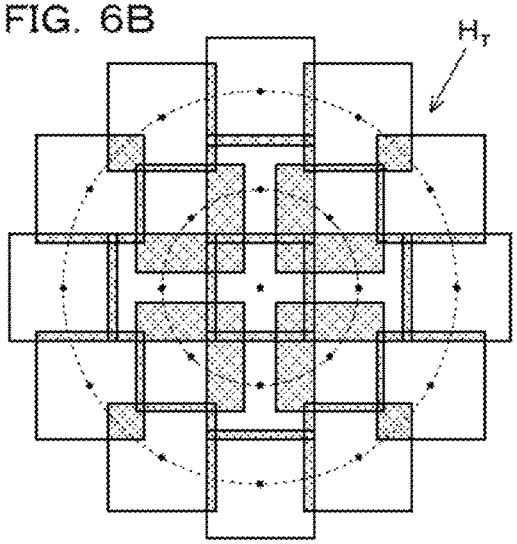
FIG. 6B is a schematic diagram showing arranged spatial frequency spectra in a spatial frequency space, which are generated from holograms data obtained using a modification of the device.

FIG. 6A shows the synthetic spatial frequency spectrum $H_T$ which is obtained by arranging in a spatial frequency space the spatial frequency spectra generated by processing, the data of the holograms obtained with the holographic imaging device 1, using the data processing method explained in the 1st embodiment. The spatial frequency spectra $H^j$, j=2, . . . , 9 are arranged on a circumference, because the illumination lights $Q^j$, j=1, . . . , 9 used are generated with the angle change unit 3 that is rotationally symmetric. FIG. 6B shows an example of a spatial frequency spectrum $H_T$ generated from object light holograms $I^j_{OR}$, j=1, . . . , 21 acquired using a modified example of angle change unit 3. In this modified example, twelve pairs of the lens 22 and the prism 23 are added on an outer circumference circle of the angle change unit 3.

Figure 7A:
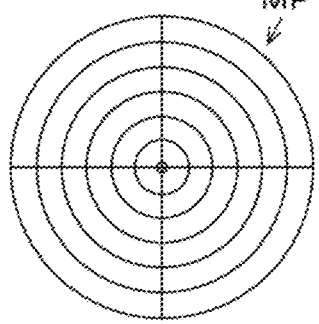
FIG. 7A is a plan view of a marking pattern to be recorded together with an object at the time of the hologram recording by the device.
Figure 7B:
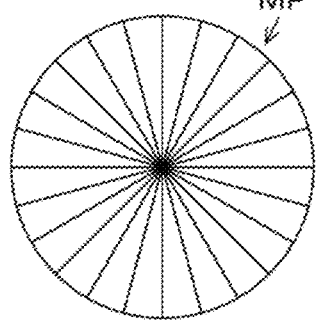
FIG. 7B and FIG. 7C are modifications of the marking pattern.
Figure 7C:
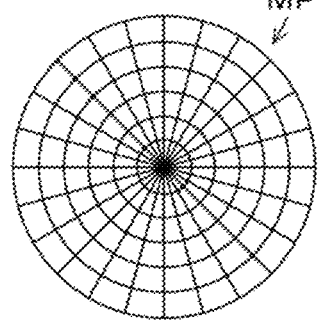

FIG. 7A, FIG. 7B and FIG. 7C show marking patterns MP to be imaged together with the object 4 when acquiring data of the object light hologram $I^j_{OR}$ in the holographic imaging device 1. Such a marking pattern MP can be placed contacted with or separated from the object 4 in front of the object 4 or behind the translucent object 4. The marking patterns MP are formed by, for example, etching a metal film formed on a transparent glass. The marking pattern MP shown here are of rotationally symmetrical graphic pattern, which show a characteristic radial pattern in the spatial frequency space. It is possible to reduce calculation error in the calculation of cross correlation function by utilizing the spatial frequency spectrum corresponding to the marking pattern MP.

According to the holographic imaging device 1 of the present embodiment, a large numerical aperture object light can be synthesized from a large number of small numerical aperture object lights by recording a large number of object lights while switching the propagation direction of the illumination light, and it is possible to reconstruct a high resolution wide field of view image from the synthetic object light. If the numerical aperture of the synthesized object light is increased to a value close to 1 by increasing the number of recorded images, the resolution of the image can be increased to one-half of the optical wavelength without changing the size of the reconstructed image to small. According to the holographic imaging device 1, it is possible to realize a long working distance wide field of view holographic microscope capable of recording and reconstructing a high resolution wide field of view three-dimensional image at a position far from an object.

According to the holographic imaging device 1 of the present embodiment, it is possible to realize a three-dimensional microscope having a long working distance and a wide field of view, and the device 1 can be used as means for microscopic observation of cultured cells in a solution having a large volume, and means for detection and inspection of minute scratches or dusts on a wide object surface at high speed. On the other hand, the working distance of the conventional high resolution optical microscope is usually 1 cm or less, and the observable field of view is fixed according to the resolution of the optical system and the number of pixels of the photo-detector. Moreover, in order to develop an optical microscope having a long working distance and a wide field of view using the conventional optical microscope technology, it is necessary to use a large diameter objective lens or a photo-detector having an enormous number of pixels, which are difficult to put into practical use.

The 3rd Embodiment: Data Processing Method

Figure 8:
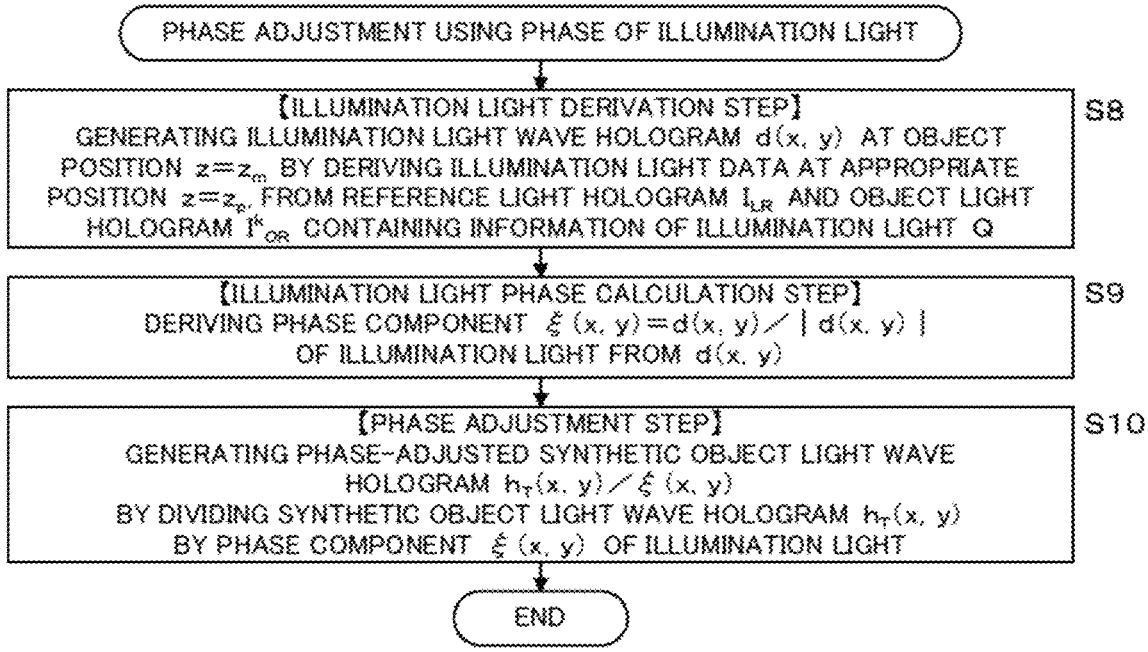
FIG. 8 is a flow chart explaining a process of the phase adjustment in the data processing method according to the 3rd embodiment.

With reference to FIG. 8, the phase adjustment process in the data processing method according to the 3rd embodiment is described. The present embodiment shows a method for adjusting the phase of the object light by using the phase of the illumination light, and by this process, a phase difference image can be observed. This process can be carried out as continuation of the process shown in the flowchart of the 1st embodiment.

In the illumination light derivation step (S8), illumination light data is derived from a specific object light hologram $I^k_{OR}$, which is one of the object light holograms $I^j_{OR}$, j=1, . . . , N, and which includes information on a specific illumination light $Q^k$, which is one of the illumination lights $Q^j$, j=1, . . . , N. The specific illumination light $Q^k$ is, for example, parallel illumination light for illuminating the object from the front thereof, namely head-on. The data of the specific illumination light $Q^k$ is extracted at an appropriate position $z=z_p$ using the reference light hologram $I_{LR}$. The reference light hologram $I_{LR}$ is used to generate the complex amplitude in-line hologram $J^k_{OL}$ from the object light hologram $I^k_{OR}$. Subsequently, an object light wave hologram $g^k(x,y)$ is generated by removing the component of the spherical wave reference light L from the complex amplitude in-line hologram $J^k_{OL}$. Those processes are performed on the hologram plane z=0. The object light wave hologram $g^k(x,y)$ is a hologram including data of the specific illumination light $Q^k$.

In order to extract the data of the specific illumination light $Q^k$ from the object light wave hologram $g^k(x,y)$, the object light wave hologram $g^k(x,y)$, namely, the object light wave is propagated to an appropriate position $z=z_P$. The appropriate position $z=z_p$ is a position where the object light $O^k$ and the specific illumination light $Q^k$ can be separated in the spatial frequency space and only the specific illumination light $Q^k$ can be extracted by filtering, for example, it is a position of a focal point when the specific illumination light $Q^k$ has the focal point. In the case of the parallel light illumination light, it is possible to converge the specific illumination light $Q^k$ by numerical processing with a numerical lens to an arbitrary position to extract the specific illumination light $Q^k$, and the converged and extracted specific illumination light $Q^k$ can be returned to the parallel light by numerical processing again. Such a method for extracting the illumination light Q can be used as a method of noise elimination when the illumination light Q is mixed as noise into the other object light $O^j$, $j=1, \ldots, N$.

In the case of the 1st embodiment, all the illumination light is assumed to be parallel light, but in a case that the specific illumination light $Q^k$ is not parallel light, and then, for example, when an illumination light having a focal point at an appropriate position $z=z_p$ is recorded as the specific illumination light $Q^k$, it is possible to extract the localized illumination light in a more pure state from among the dispersed object light at position $z=z_p$. The light waves of the specific illumination light $Q^k$ extracted at the appropriate position $z=z_p$ are propagated to the position $z=z_m$ of the object and are set as the illumination light wave hologram $d(x, y)$ at the position $z=z_m$ of the object.

In the illumination light phase calculation step (S 9), the illumination light wave phase component $\xi(x,y)=d(x,y)/|d(x,y)|$ for the specific illumination light $Q_k$ is calculated using the illumination light wave hologram $d(x,y)$.

In the phase adjustment step (S10), by dividing the synthetic object light wave hologram $h_T(x,y)$ by the illumination light wave phase component $\xi(x,y)$, a phase adjusted synthetic object light wave hologram $h_T(x,y)/\xi(x,y)$ is generated.

The 4th Embodiment: Data Processing Method

Figure 9:
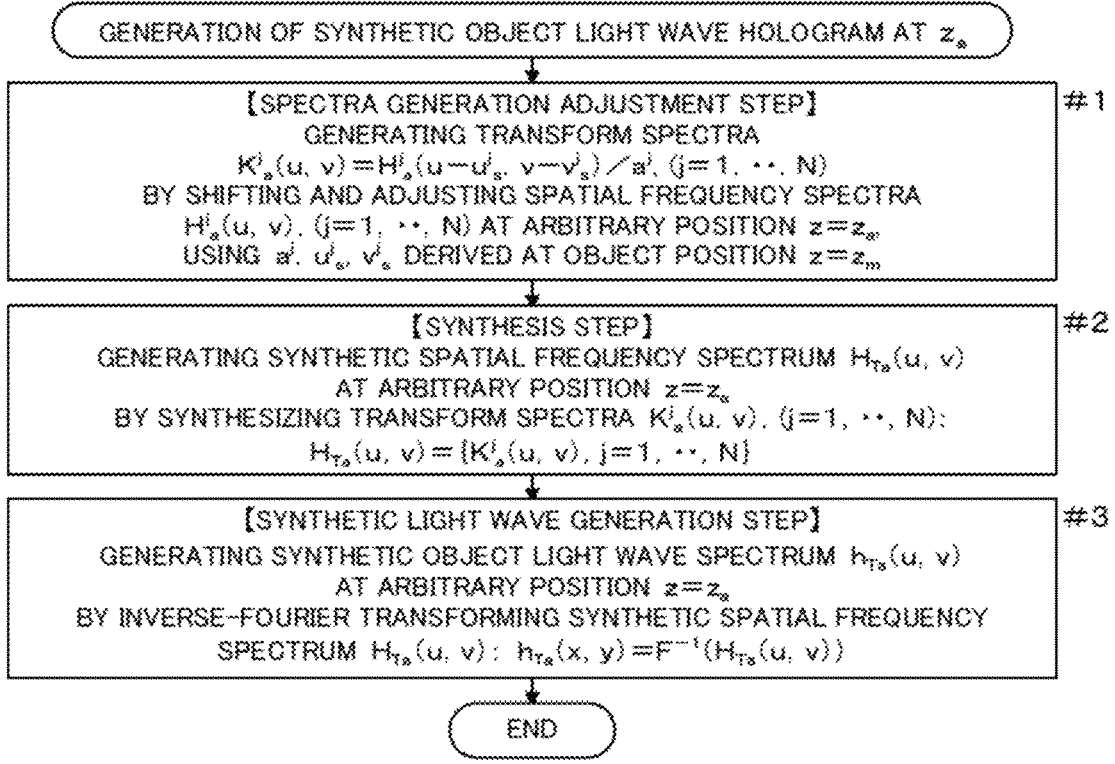
FIG. 9 is a flow chart explaining a process of the image reconstruction at an arbitrary position in the data processing method according to the 4th embodiment.

With reference to FIG. 9, generation of a synthetic object light wave hologram at an arbitrary position $z_a$ in the data processing method according to the 4th embodiment is described.

In the spectra generation and adjustment step (#1), firstly, object light spatial frequency spectra $H^j(u,v)$, $j=1, \ldots, N$ at the object position $z=z_m$ are converted into object light spatial frequency spectra $H^j_a(u,v)$, $j=1, \ldots, N$ at an arbitrary position $z=z_a$. Secondly, the obtained spatial frequency spectra $H^j_a(u,v)$, $j=1, \ldots, N$ at the arbitrary position $z=z_a$ are shifted and adjusted using $a^j$, $u^j_s$, $v^j_s$ obtained at the object position $z=z_m$. In the processes for shifting and adjusting, the shift amount $(u^j_s, v^j_s)$ in the cross correlation step (S4) and the fitting coefficient $a^j$ in the fitting coefficient derivation step (S5) of the 1st embodiment are used. By those processes, transform spectra $K^j_a(u,v)=H^j_a(u-u^j_s, v-v^j_s)/a^j$, $j=1, \ldots, N$ are generated, each of which is moved to a predetermined position in the spatial frequency space and has adjusted amplitude and phase.

In the synthesis step (#2), as in the synthesis step (S6) of the 1st embodiment, the transform spectra $K^j_a(u,v)$, $j=1, \ldots, N$ are synthesized, and a synthetic spatial frequency spectrum $H_{Ta}(u,v)$ at the arbitrary position $z=z_a$ is generated. The spatial frequency spectrum $H_{Ta}(u,v)$ is a union of the transform spectra, that is, $H_{Ta}(u,v)=\{K^j_a(u,v), j=1, \ldots, N\}$.

In the synthetic light wave generating step (#3), similarly to the step (S7) of the 1st embodiment, the synthetic spatial frequency spectrum $H_{Ta}(u,v)$ is inverse-Fourier transformed, and a synthetic object light wave hologram $h_{Ta}(x,y)=F^{-1}(H_{Ta}(u, v))$ is generated.

The 5th Embodiment: Data Processing Method

With reference to FIG. 10, the phase adjustment process using the phase of the head-on illumination light in the data processing method according to the 5th embodiment is described. The data processing of this embodiment is a general processing applicable to the phase adjustment processing using the phase of the head-on illumination light in the case where the object is illuminated from the front with a nonparallel head-on illumination light $Q^f$, and it is applicable also in the case that the illumination is done with a parallel head-on illumination light. In this embodiment, the data processing (S31 to S34) replace the initialization step (S3) of the 1st embodiment in the case only the data for $j=1$ is acquired by nonparallel head-on illumination light $Q^1$, and other processes are done by using the process of the 1st embodiment to generate a synthetic light wave $h_T(x,y)$.

In the illumination light derivation step (S31), an illumination light wave hologram $d(x,y)$ at the object position $z=z_m$ is generated by deriving illumination light data, at an appropriate position $z=z_p$, from the reference light hologram $I_{LR}$ and the object light hologram $I^1_{OR}$ containing information on the head-on illumination light $Q^1$. Here, the illumination light $Q^1$ for $j=1$ is used as the head-on illumination light, but the numbering by the j is optional, and in the following, f is used instead of $j=1$.

Therefore, more generally speaking, first of all, data of a head-on illuminated object light hologram $I^f_{OR}$ is acquired, which is an off-axis hologram of interference fringes between an object light $O^f$ emitted from an object illuminated from the front thereof, namely, by a head-on illumination, with a nonparallel head-on illumination light $Q^f$, the head-on illumination light $Q^f$, and an off-axis spherical wave reference light R. Using the acquired data of the reference light hologram $I_{LR}$ and the head-on illuminated object light hologram $I^f_{OR}$, a head-on illumination object light wave hologram $h^f(x,y)$ representing the light wave of the object light $O^f$ caused by the head-on illumination and an illumination light wave hologram $d(x,y)$ representing the light wave of the head-on illumination light $Q^f$ are generated at the object position $z=z_m$. The processes of generating the holograms $h^f(x,y)$ and $d(x,y)$ are performed by using the filtering process described in the illumination light derivation step (S8) of the 3rd embodiment.

In the illumination light phase calculation step (S32), an illumination light wave phase component $\xi(x,y)=d(x,y)/|d(x,y)|$ for the head-on illumination light $Q^f$ is calculated using the illumination light wave hologram $d(x,y)$, and a phase adjusted head-on illuminated object light wave hologram $h^f(x,y)/\xi(x,y)$ is generated by dividing the head-on illuminated object light wave hologram $h^f(x,y)$ by the illumination light wave phase component $\xi(x,y)$. In the illumination light phase calculation step (S9) of the 3rd embodiment, the phase adjustment processing is performed on the final synthetic object light wave hologram $h_T(x,y)$, however, in the present embodiment, it is done on the unsynthesized hologram.

In the phase adjustment step (S33), an object light spatial frequency spectrum $H^f(u,v)$ of the object light $O^f$ caused by the head-on illumination is generated by Fourier transforming the phase adjusted object light wave $h^f(x,y)/\xi(x, y)$.

In the initialization step (S34), the spectrum $H^f(u,v)$, which is phase adjusted, is set to be $H^j(u,v)$, $j=1$ by numbering with j, and similar to the initialization step (S3) of the first embodiment, $H^j(u,v)=H^j(u,v)$, j=1 is set to be the synthesized spatial frequency spectrum $H_T(u,v)$. The process of obtaining the synthetic object light wave hologram $h_T(x, y)$ is the same as the process of the 1st embodiment.

When described separately from the 1st embodiment, a synthetic object light spatial frequency spectrum $H_T(u,v)$ is generated by sequentially arranging a plurality of object light spatial frequency spectra $H^j(u,v)$, j=1, ..., N based on calculation of the cross correlation function and based on the object light spatial frequency spectrum $H^j(u,v)$ by the head-on illumination. The processing of adjusting the amplitude and phase between the respective spectra $H^j(u,v)$ may be performed at the time sequentially arranging the spectra $H^j$ as in the 1st embodiment, or may be performed after the arrangement is completed.

The 6th Embodiment: Transmission Type Long Working Distance Wide Field of View Imaging Device With reference to FIG. 11 and FIG. 12, a schematic configuration of an angle change unit of the transmission type holographic imaging device according to the 6th embodiment is described. As shown in FIG. 11, the angle change unit 3 of the present embodiment comprises a biaxial rotary reflecting mirror MV for deflecting the illumination light Q of parallel light in an arbitrary direction, and a 4f lens system formed by combining two lenses 22. The 4f lens system is an optical system for propagating a parallel light radiated from a certain radiation point in an arbitrary direction, so that the parallel light passes through a fixed convergence point away from the radiation point. In the present embodiment, the radiation point is set at the position of the biaxial rotary reflecting mirror MV and the convergence point is set at the position of the object 4.

As shown in FIG. 12, using this angle change unit 3, one head-on illumination light and eight oblique incident illumination lights are generated to obtain object light holograms, and the synthetic spatial frequency spectrum $H_T$ has a shape in which each spectrum $H^j$ is arranged in a lattice pattern.

The mechanical operating portion of the angle change unit 3 in this 6th embodiment is the biaxial rotary reflecting mirror MV, and the mechanical operating portion in the 2nd embodiment is the rotating plate 3a as shown in FIG. 4 and FIG. 5. Any of those angle change units 3 can generate the illumination light Q whose angle is changed stably and with good reproducibility.

The 7th Embodiment: Reflection Type Long Working Distance Wide Field of View Imaging Device With reference to FIG. 13 and FIG. 14, a reflection type holographic imaging device according to the 7th embodiment is described. The holographic imaging device 1 of the present embodiment is a reflection type version of the transmission type holographic imaging device 1 according to the 2nd embodiment. Like the transmission type device, this reflection type holographic imaging device 1 has also a long working distance and can realize wide field of view imaging.

As shown in FIG. 13A and FIG. 13B, the holographic imaging device 1 includes an angle change unit 3 similar to the angle change unit 3 in the 2nd embodiment. The illumination light Q, which is a parallel light generated by the angle change unit 3, propagates straight and illuminates the object 4. The object light O emitted from the surface of the illuminated object 4 propagates reversely with respect to the illumination light Q, and is reflected by the half mirror HM placed in front of the photo-detector 5 to enter the photo-detector 5.

The off-axis spherical wave reference light R passes through the condenser lens 24 to form a focal point P1, then, while diverging, is reflected by the reflecting mirror M2 toward the photo-detector 5 to enter the photo-detector 5 after passing through the half mirror HM in front of the photo-detector 5.

Figure 14:
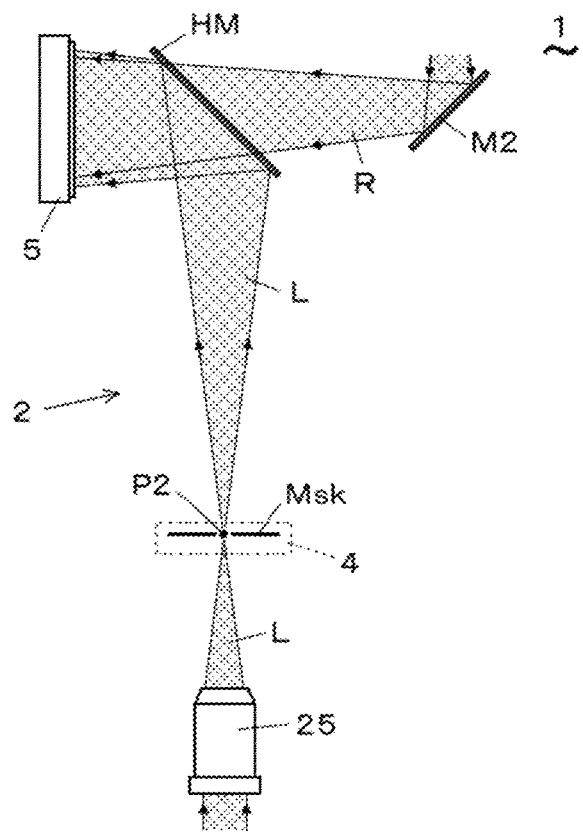
FIG. 14 is a partial side view explaining recording of the reference light hologram in the device.

As shown in FIG. 14, the in-line spherical wave reference light L passes through the condenser lens 25 that generates a spherical wave to form a condensing point P2, then, while diverging, is reflected by the half mirror HM in front of the photo-detector 5 to enter the photo-detector 5. The optical system of the in-line spherical wave reference light L comprises a mask Msk having a pinhole at the position of the focal point P2.

The 8th Embodiment: Transmission Type Ultra-High Resolution Microscope

With reference to FIG. 15A to FIG. 17B, a transmission type holographic imaging device according to the 8th embodiment is described. The holographic imaging device 1 of the present embodiment is a device that uses the data processing method of the 1st embodiment and can realize a transmission type microscope having ultra-high resolution.

Figure 15A:
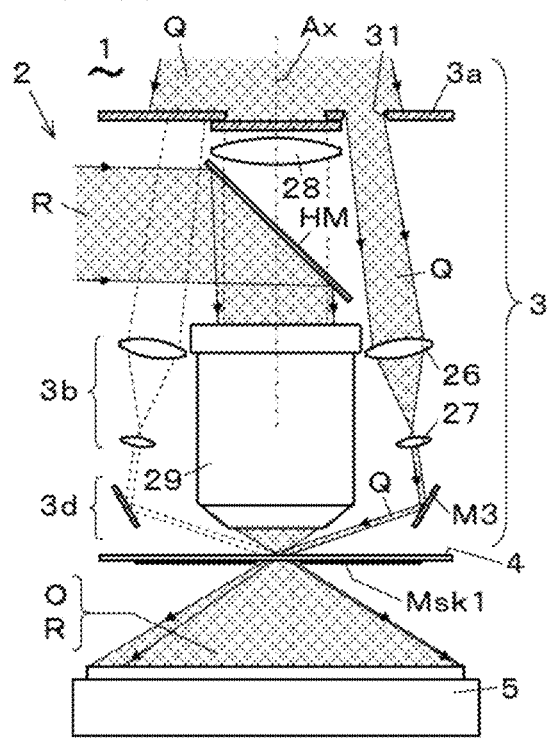
FIG. 15A is a side view showing the schematic constitution of the transmission type holographic imaging device according to the 8th embodiment.
Figure 15B:
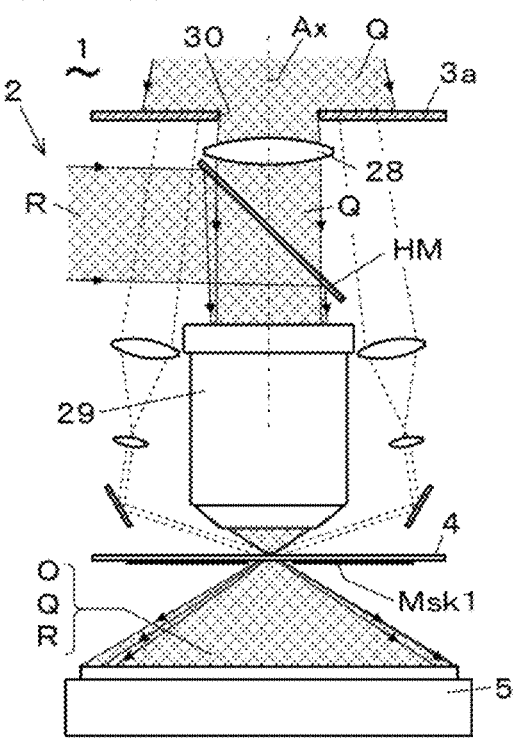
FIG. 15B is a partial side view explaining the head-on illumination in the device.

FIG. 15A and FIG. 15B, in order to realize a transmission type ultra-high resolution microscope, the holographic imaging device 1 comprises an angle change unit 3 for changing the incident direction of the illumination light Q to the object 4, a photo-detector 5 having a large numerical aperture, and a condenser lens 29 for generating an off-axis spherical wave reference light R and an in-line spherical wave reference light L each of the lights R, L has a large numerical aperture. The condenser lens 29 is disposed in front of the object 4 being disposed in front of the photo-detector 5 so as to have a focal point at the position on the surface of the object 4 illuminated with the illumination light Q. In the optical system 2 including the condenser lens 29, the numerical aperture $NA_O$ of the photo-detector 5 with respect to the object lights $O^j$, j=1, ..., N has a value close to 1, and the synthetic numerical aperture determined by the synthetic object light spatial frequency spectrum $H_T(u,v)$ exceeds 1.

The angle change unit 3 includes a rotating plate 3a, a lens assembly 3b, and a reflecting mirror assembly 3d. Like the rotating plate 3a of the 2nd embodiment, this rotating plate 3a has a circular center opening 30 having a shutter and an eccentric opening 31 provided at an eccentric position. The rotary plate 3a receives the light diverging in a cone shape, intermittently rotates around the optical axis Ax, and then, using the eccentric opening 31, distributes a part of the light diverging in the cone shape as the illumination light Q. On the optical axis Ax passing the center opening 30 of the rotating plate 3a, there is provided a lens 28 which makes a light for head-on illumination enter the condenser lens 29.

The lens assembly 3b includes a plurality of lenses 26, 27, arranged around the optical axis Ax, for converting each of the lights distributed by the rotating plate 3a into a thin parallel light suitable for microscopic observation. The reflecting mirror assembly 3d has reflecting mirrors M3 for changing the direction of each of the parallel lights coming from the lens assembly 3b so that each of the light passes through one point on the optical axis Ax.

The off-axis spherical wave reference light R is generated from a parallel light, which goes, with inclined optical axis, into the condenser lens 29 so as to be converged at a position close to the surface illuminated with the illumination light Q on the object 4. At the entrance of the condenser lens 29, a half mirror HM is provided. The half mirror HM reflects a parallel light, for the off-axis spherical wave reference light R, incident from the side of the optical axis Ax and makes it enter the condenser lens 29. The off-axis spherical wave reference light R is focused at the position deviating from the optical axis Ax and then incident on the photo-detector 5 while diverging. The half mirror HM allows the light for head-on illumination to pass through, and makes it enter the condenser lens 29.

The head-on illumination light Q condensed by the condenser lens 29 is also focused at a position between the condenser lens 29 and the photo-detector 5, at which the obliquely incident illumination lights Q are gathered, and at this focusing position the translucent object 4 is arranged. Object lights $O^j$, $j=1, \ldots, N$ are generated by such illumination lights $Q^j, j=1, \ldots, N$ passing through the object 4. The oblique illumination lights Q passing through the object 4 do not enter the photo-detector 5, but the head-on illumination light Q is incident on the photo-detector 5. Although the head-on illumination light Q and the object light O are recorded together in an object light hologram $I_{OR}$, they can be separated from each other by post-processing of the hologram data. That is, the head-on illumination light Q is a light after focused by the condenser lens 29, and can be separated from the expanded object light O at the position of the focusing point.

Figure 17A:
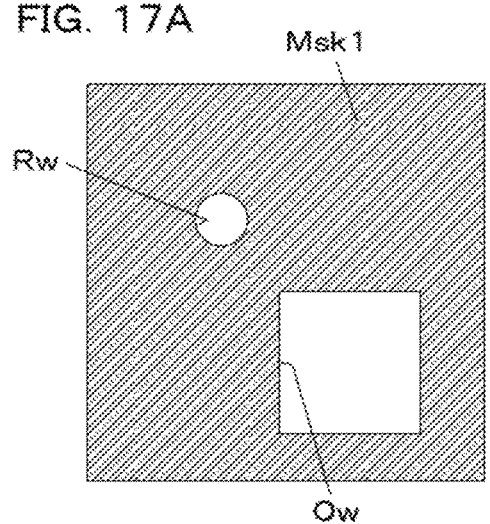
FIG. 17A is a plan view of the mask used for recording an object light hologram by the device.

The off-axis spherical wave reference light R is focused at the position adjacent to the focusing position of the illumination light Q where the object light O is generated, and accordingly the reference light R becomes off-axis. A mask Msk1 having windows, through which the off-axis spherical wave reference light R and the object light O pass in a separated state, is arranged on the back side of the object 4, that is, on the side facing the photo-detector 5. The mask Msk1 is formed of, for example, a metal thin film deposited on a glass substrate, and can be used as a support for supporting the object 4 from back side. FIG. 17A shows an example of the mask Msk1. The window Rw is a window through which the off-axis spherical wave reference light R passes, and the rectangular window Ow is a window through which the object light O passes.

Figure 16A:
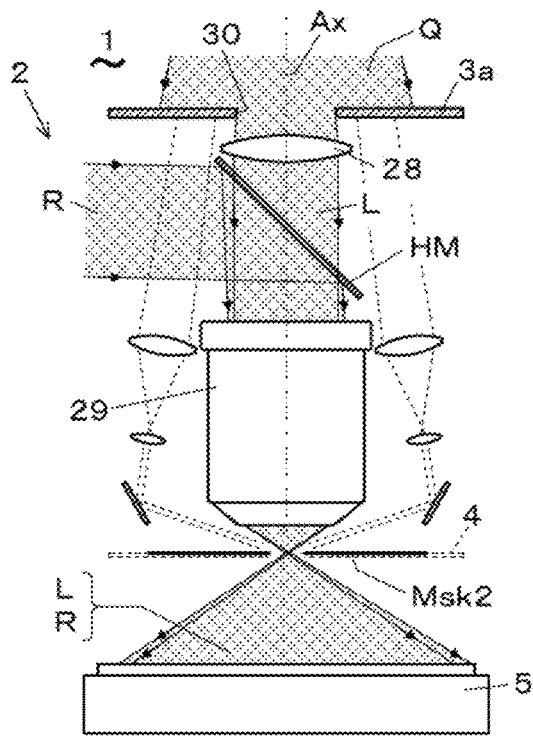
FIG. 16A is a partial side view explaining recording of the reference light hologram in the device.
Figure 16B:
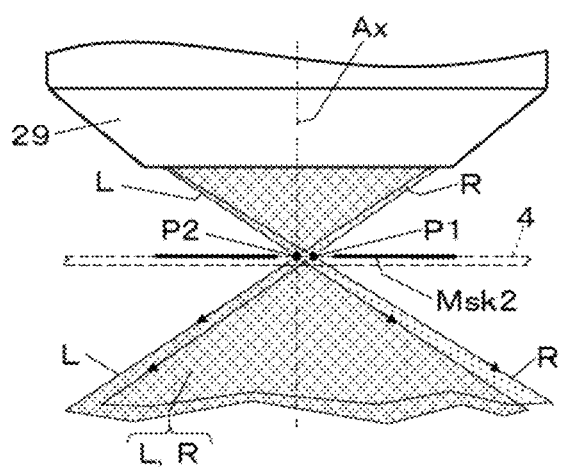
FIG. 16B is a principal part detail view of FIG. 16A.

FIG. 16A and FIG. 16B show the optical system for acquiring the reference light hologram $I_{LR}$. The in-line spherical wave reference light L is generated through the condenser lens 29 in the absence of the object 4. The light for the in-line spherical wave reference light L is the same as the head-on illumination light Q. The light for the reference light L coming from the center of the rotating plate 3a, and going through the lens 28, the half mirror HM, and the condenser lens 29, is condensed at the position where the object was or will be arranged, and enters the photo-detector 5 while diverging as a spherical wave. In addition, the light for the off-axis spherical wave reference light R is reflected by the half mirror HM, and condensed in the off-axis state through the condenser lens 29, and enters the photo-detector 5 while diverging as a spherical wave, in the same way and state as the object light hologram $I_{OR}$ being acquired.

Figure 17B:
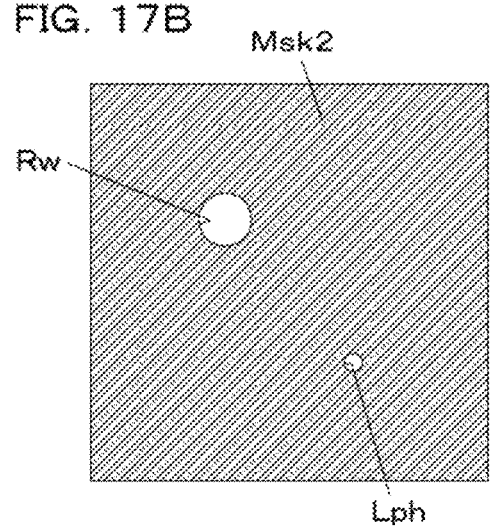
FIG. 17B is a plan view of a mask used for recording a reference light hologram by the device.

FIG. 16B shows the positional relationship between the focal point P1 of the off-axis spherical wave reference light R, the focal point P2 of the in-line spherical wave reference light L, and the mask Msk2 used for acquisition of the reference light hologram $I_{LR}$. The focal points P1 and P2 are in an off-axis relationship with each other. Further, the position of the focal point P2 of the in-line spherical wave reference light L is in-line to the object light O. The pinhole Lph in the mask Msk2 shown in FIG. 17B is a pinhole through which the in-line spherical wave reference light L passes. When the masks Msk1 and Msk2 are piled up mutually, the windows Rw of both are coincident, and the pinhole Lph for the reference light L comes to the center of the window Ow for the object light O.

Since the holographic imaging device 1 of this embodiment is constituted so that the numerical aperture $NA_O$ of the photo-detector 5 with respect to the object light O has a value close to 1 and the data of the object light O is obtained by the obliquely incident illumination light Q, the contribution of the numerical aperture due to the illumination light can be taken in, and a transmission type microscope of ultra-high resolution can be realized.

The 9th Embodiment: Reflection Type Ultra-High Resolution Microscope

With reference to FIG. 18 to FIG. 21, a reflection type holographic imaging device according to the 9th embodiment is described. The holographic imaging device 1 of the present embodiment is a device that uses the data processing method of the 1st embodiment and can realize a reflection type microscope having ultra-high resolution.

Figure 18:
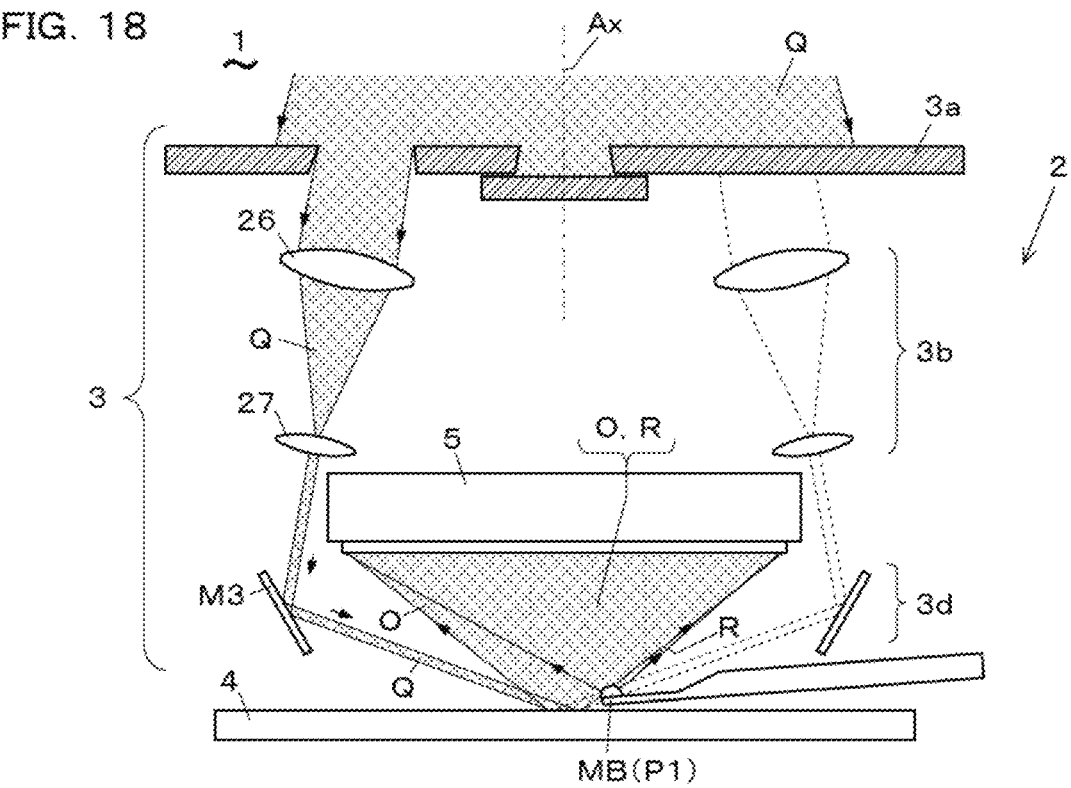
FIG. 18 is a side view showing the schematic constitution of the reflected type holographic imaging device according to the 9th embodiment.

As shown in FIG. 18, in order to realize a reflection-type ultra-high resolution microscope, the holographic imaging device 1 comprises an angle change unit 3 for changing the incident direction of the illumination light Q to the object 4, a photo-detector 5 having a large numerical aperture, and a micro spherical ball MB for generating an off-axis spherical wave reference light R having a large numerical aperture. The angle change unit 3 includes a rotating plate 3a, a lens assembly 3b, and a reflecting mirror assembly 3d similar to the angle change unit 3 in the 8th embodiment.

Figure 19:
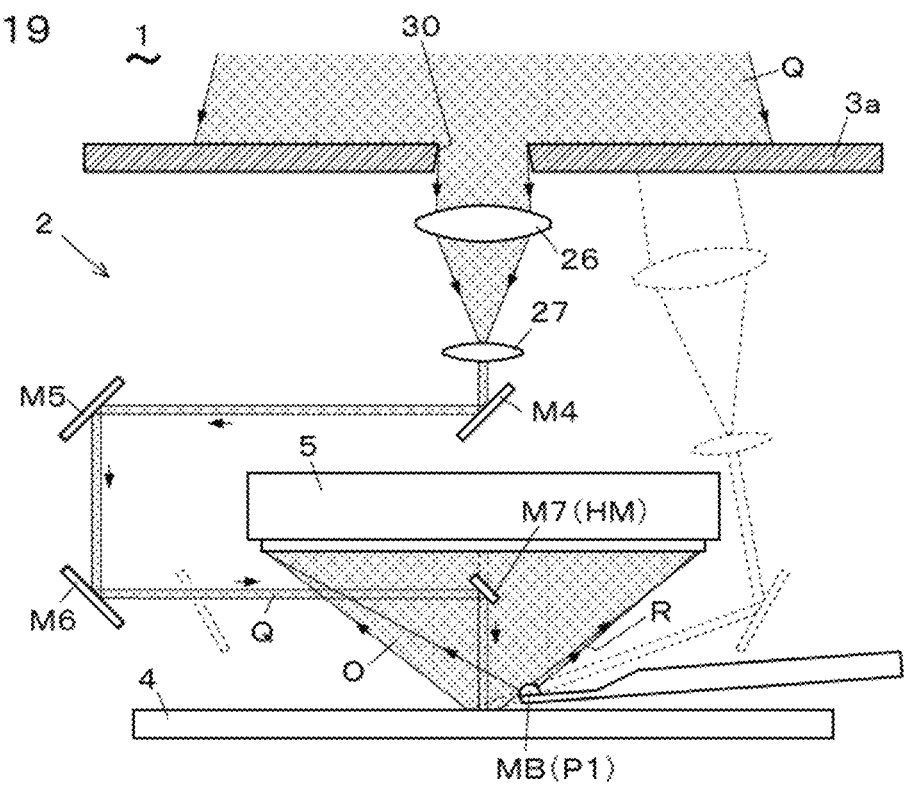
FIG. 19 is a side view explaining the head-on illumination in the device.

As shown in FIG. 19, the optical system 2 includes lenses 26 and 27 for making the light, coming from the center opening 30 of the rotating plate 3a, into a thin beam shape suitable for microscopic observation, and reflecting mirrors M4, M5, and M6 guiding the beam shape illumination light Q to the center in front of the photo-detector 5, and a reflecting mirror M7 which is located at the center in front of the photo-detector 5 and makes the head-on illumination light Q perpendicularly incident on the object 4. The reflecting mirror M7 is a small half mirror so as not to disturb the propagation of the object light O as much as possible.

Figure 20:
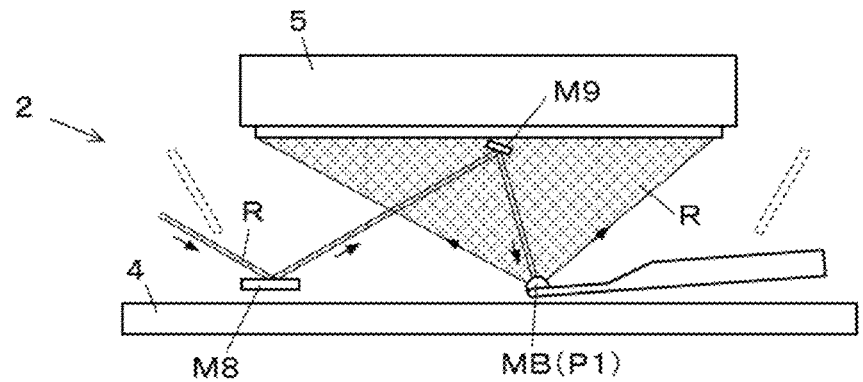
FIG. 20 is a principal part side view explaining the generation of off-axis spherical wave reference light and illumination therewith in the device.

As shown in FIG. 20, the micro spherical ball MB is fixed and arranged using a supporting rod or a support plate, etc, at a position close to the surface of the object 4 illuminated with the illumination light Q, and at the position between the photo-detector 5 and the object 4. The light for the off-axis spherical wave reference light R is a thin beam shape light and irradiates the micro spherical ball MB after propagation including two times reflections with a reflecting mirror M8 disposed at a position close to the surface of the object 4 and with a reflecting mirror M9 disposed near the center surface of the photo-detector 5. The reflected light from the spherical surface of the micro spherical ball MB is radiated toward the photo-detector 5 as the off-axis spherical wave reference light R. The center of the micro spherical ball MB is the focal point P1 of the spherical wave reference light R.

Figure 21:
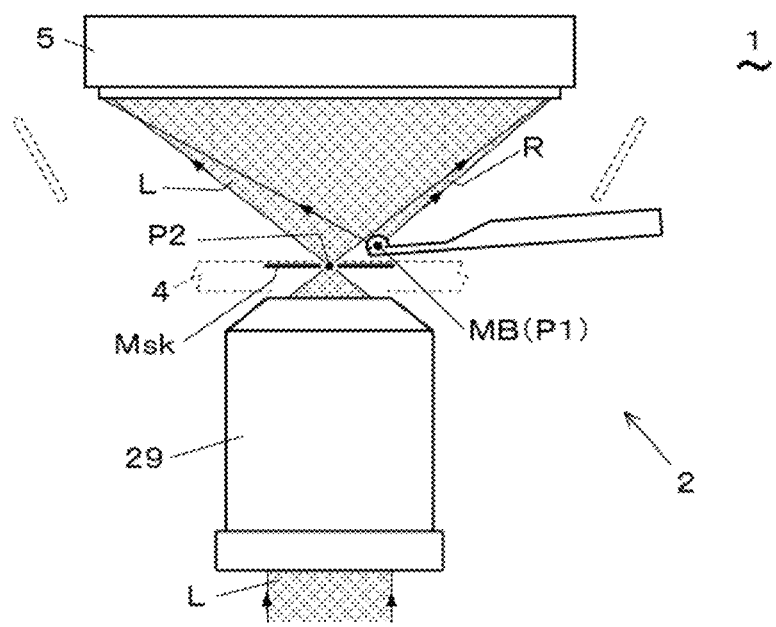
FIG. 21 is a partial side view explaining recording of the reference light hologram in the device.

As shown in FIG. 21, the in-line spherical wave reference light L is generated from a parallel light in the absence of the object 4, wherein the parallel light is focused by the condenser lens 29 having the focal point P2 at a position, in front of the center of the photo-detector 5, corresponding to the position of the object 4. A pinhole is arranged at the focal point P2 with the mask Msk. The focal point P2 of the in-line spherical wave reference light L is in-line to the position where the object light O was or will be generated, and the focal point P1 of the off-axis spherical wave reference light R is in off-axis relation to the focal point P2.

In the case of the oblique illumination light Q, the object light hologram $I_{OR}$ is acquired by switching the incident direction using the optical system 2 of FIG. 18, and in the case of the head-on illumination light Q, it is acquired using the optical system 2 of FIG. 19. Further, the reference light hologram $I_{LR}$ is acquired using the optical system 2 in FIG. 21. When an object light with a large numerical aperture is recorded as a plurality of holograms by switching the propagation direction of the illumination light Q, it is possible to create a large numerical aperture object light having a numerical aperture close to 2 by synthesizing the object lights reconstructed from the holograms, and it is possible to realize an ultra-high resolution holographic microscope which exceeds the resolution limit of an ordinary optical microscope.

Tenth Embodiment: Data Processing

With reference to FIG. 22 to FIG. 24, the light wave hologram g and the spatial sampling interval δ are described. Each of the holographic imaging devices described above records the object light O by using the spherical wave reference light R having the focal point P1 at a position close to the generation point of the object light O spreading like a spherical wave. Therefore, the spatial frequency band of the hologram of the interference fringes of the object light O and the reference light R is narrowed. From such a hologram, if a hologram with only the object light O alone is taken out, the spatial frequency band becomes broader to high frequency. From this, it can be seen that the light wave hologram g(x,y) of above equation (10) expressing the wavefront of the object light O has a broader space frequency band than the complex amplitude in-line hologram $J_{OL}(x,y)$ of above equation (9).

The spatial variation of the light wave hologram g(x,y) becomes larger as going away from the center of the hologram and becomes maximum at the edge of the hologram. If the numerical aperture of the hologram is $NA_O$ and the optical wavelength is λ, the maximum spatial frequency $f_M$ of the light wave hologram g(x, y) is expressed by $f_M = NA_O/λ$. In order to express this broadband light wave hologram g(x,y) as discrete values, it is necessary to set the spatial sampling interval δ as the value of $δ=1/(2f_M)=λ/(2NA_O)$ or less, according to the restrictions of the sampling theorem. In order to overcome the restrictions of sampling theorem, sampling points are increased and data interpolation is performed. Since the complex amplitude in-line hologram $J_{OL}$ is of narrow band, and gently changes at the pixel pitch d of the photo-detector 5, high speed calculation using the 3rd equation is possible in data interpolation.

Figure 22A:
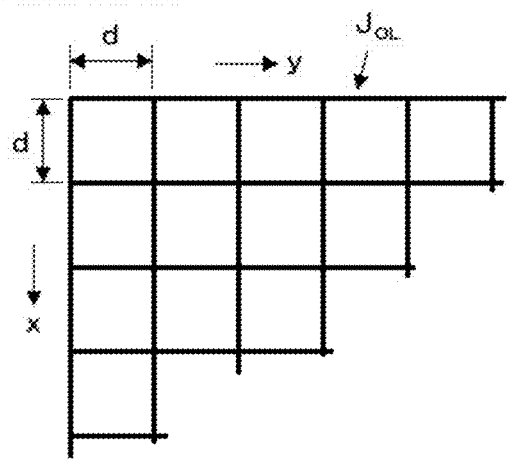
FIG. 22A is a partial view of a hologram to be processed by the data processing method used for the holographic imaging device according to the 10th embodiment.
Figure 22B:
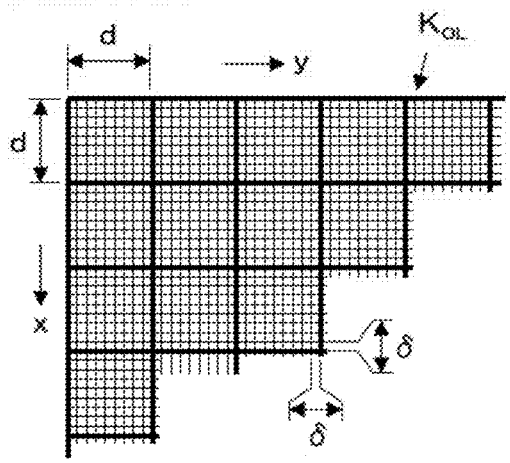
FIG. 22B is a figure showing a way to increase the spatial sampling points in the hologram of FIG. 22A.

FIG. 22A and FIG. 22B show a method for reducing the spatial sampling interval δ of a hologram using data interpolation in order to obtain the light wave hologram g(x,y). The complex amplitude in-line hologram $J_{OL}$ is obtained without using an imaging lens. Therefore, distortion does not occur even if the spatial sampling interval is subdivided and reduced to about the light wavelength. Therefore, it is possible to reduce the sampling interval by substantially increasing the number of pixels by a pixel number increase process.

For the complex amplitude in-line hologram $J_{OL}$ having the spatial sampling interval d corresponding to the pixel pitch d of the photo-detector 5, the spatial sampling interval d is subdivided into the spatial sampling interval δ in the pixel number increase process. Thereafter, data interpolation is performed on the new sampling points generated by subdivision to practically increase the number of pixels. As a method of data interpolation, data interpolation by a well-known 3rd equation in image processing or data interpolation by a sinc function can be used. If the sinc interpolation is used as data interpolation, it takes more time for numerical calculation than interpolation using the 3rd equation, but more accurate results can be obtained.

The result of increasing the number of pixels by interpolation for the complex amplitude in-line hologram $J_{OL}$ is defined again as a complex amplitude in-line hologram $J_{OL}$. Note that the pixel pitch d of the photo-detector 5 may be different from each other in the pixel arrangement direction (xy direction), and the spatial sampling interval δ may also be different from each other in the pixel arrangement direction. The complex amplitude in-line hologram $J_{OL}$ having the increased number of pixels becomes a hologram recording an image expanded, without distortion, by magnification d/δ, namely, an image of improved resolution based on the ratio of the pixel pitch d to the spatial sampling interval δ above-mentioned, as compared with the hologram on which the pixel number increase process is not performed.

(High Speed Processing)

FIG. 23A to FIG. 24B show a method for processing the light wave hologram g(x,y) at high speed. When hologram data is processed using Fast Fourier Transform (FFT), if the required number of sampling points becomes too large, it becomes difficult to process the light wave hologram g(x,y). Note that each information recorded in different frequency bands is preserved without being lost even when spatially superimposed. Utilizing this fact, it is possible to create a broadband micro hologram (hologram with a small number of data points) by superimposing the light wave hologram g(x,y) which is a large numerical aperture object light of broadband. Further, the hologram holds information for reconstructing light waves in each of the divided regions.

Figure 23A:
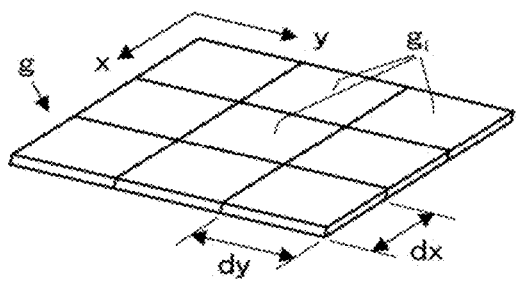
FIG. 23A is a conceptual view of a hologram with which the method of processing a hologram at high speed is applied.
Figure 23B:
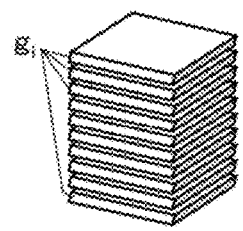
FIG. 23B is a conceptual view showing divided holograms are piled up.
Figure 23C:
FIG. 23C is a conceptual view showing a hologram formed by synthesizing the holograms of FIG. 23B.
Figure 24A:
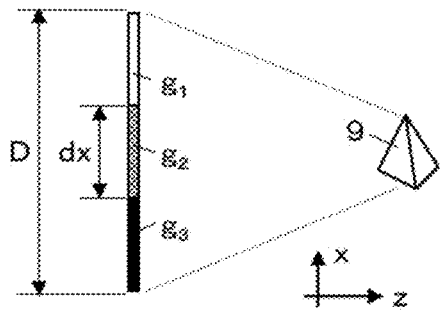
FIG. 24A is a conceptual view showing a single hologram for reconstruction and a reconstructed image.

Therefore, as shown in FIG. 23A, the light wave hologram g(x,y) is divided into a plurality of minute holograms $g_i$ of widths dx, dy, and as shown in FIG. 23B and FIG. 23C, the micro holograms $g_i$ are superimposed on each other or piled up to generate a synthetic minute hologram Σ. Computation based on above equation (11) is applied to this synthetic hologram Σ to shorten the calculation time to obtain the complex amplitude G(u,v). FIG. 24A shows how the light wave hologram g(x,y) of width D is divided into minute holograms $g_1$, $g_2$, and $g_3$ of widths dx, dy. This light wave hologram g(x,y) reconstructs the light wave (reconstructed image 9) with one piece.

Figure 24B:
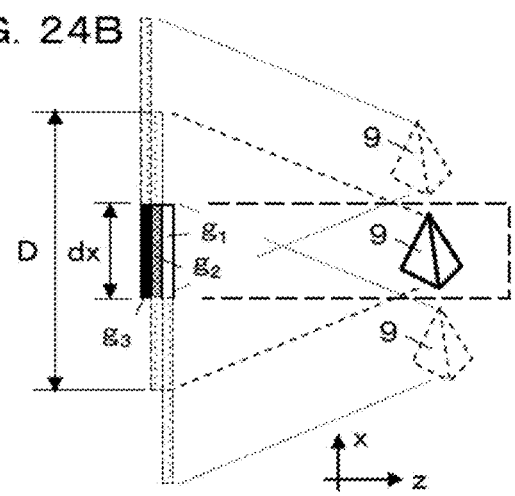
FIG. 24B is a conceptual view of a plurality of holograms for reconstruction and a plurality of reconstructed images used for explaining the principle of the way for processing a hologram at high speed.

As shown in FIG. 24B, the holograms overlapped, while shifting the light wave holograms g(x,y), by the width dx in the x direction for example, become a periodic hologram having a width dx, and can reconstruct many same reconstructed images 9 at intervals of the width dx. The number of calculation points is compressed to the reciprocal number of the number of the minute holograms $g_i$ superimposed. That is, when n pieces are superimposed, the calculation amount becomes 1/n.

(High-Speed Processing by Discrete Fourier Transform)

Calculation of the complex amplitude G(u,v) is performed through the steps of subdivision of spatial sampling intervals and data interpolation, generation of a synthetic hologram Σ by dividing and superimposing a hologram, and plane wave expansion processing by Fourier transformation of the hologram Σ. In such a calculation method, calculation time is required especially for subdivision of the sampling interval and data interpolation, and hologram superimposition. If the complex amplitude G(u,v) can be obtained directly from the minute divided holograms $g_i$ without performing the data interpolation, the calculation speed can be increased.

The spatial frequency of the light wave hologram g represented by above equation (10) becomes higher as it goes from the center to the end. Considering each parallel light $L_i$ irradiated from the focal point $z_L$ of the spherical wave reference light L toward each center of the divided hologram $g_i$, the angle between the object light O and the parallel light $L_i$ becomes small in the hologram $g_i$. When the phase of the parallel light $L_i$ is represented by $\varphi_i(x,y)$, and the hologram $g_i$ is multiplied by the phase factor $\exp(-i\varphi_i)$, the spatial frequency of $g_i\exp(-i\varphi_i)$ becomes low.

As shown in following equation (22), coordinates (x,y) of a pixel (k,l) in the hologram $g_i$ having N×N pixels are expressed by (x,y)=(kd, ld). Also, as shown in following equation (23), a set of integer values $(m_{iC}, n_{iC})$ is introduced. As a result, as shown in following equation (24), the phase $\varphi_i(k,l)$ for the pixel (k,l) is expressed using integer-ized values $(m_{iC}, n_{iC})$.

$$x = kd, \quad y = ld \quad (22)$$

$$m_{iC} = \text{INT}(\Delta\sin\theta_{ix}/\lambda), \quad n_{iC} = \text{INT}(\Delta\sin\theta_{iy}/\lambda) \quad (23)$$

$$\phi_i(k, l) = 2\pi\left(\frac{m_{iC}k + n_{iC}l}{N}\right) \quad (24)$$

Here, $\theta_x$ and $\theta_y$ represent incident angles in the x and y directions, respectively, of the parallel light $L_i$ entering the hologram $g_i$. The value $g_i(k,l)\exp(-i\varphi_i(k,l))$ at each of the sampling points k=0, 1, 2, ..., N−1, and l=0, 1, 2, ..., N−1, and the discrete Fourier transform $G_i'(m,n)$ thereof are given by following equation (26) and (27), respectively.

$$G_i'(m, n) = \sum_{k=0}^{N-1}\sum_{l=0}^{N-1}\left\{g_i(k, l)\exp\left[-i2\pi\left(\frac{m_{iC}k + n_{iC}l}{N}\right)\right]\right\}\exp\left[-i2\pi\left(\frac{mk + nl}{N}\right)\right] \quad (25)$$

$$g_i(k, l)\exp\left[-i2\pi\left(\frac{m_{iC}k + n_{iC}l}{N}\right)\right] = \frac{1}{N^2}\sum_{m=0}^{N-1}\sum_{n=0}^{N-1}G_i'(m, n)\exp\left[i2\pi\left(\frac{mk + nl}{N}\right)\right] \quad (26)$$

As can be seen from above equation (25), $G_i'(m,n)$ becomes a periodic function of period N with respect to m and n. Since the maximum spatial frequency $f_M$ of the low spatial frequency function $g_i\exp(-i\varphi_i)$ satisfies the inequality $f_M<1/(2d)$, according to the sampling theorem, the periodic function $g_i\exp(i\varphi_i)$ can be accurately described using the spatial frequency components $G_i'(m,n)$ in the intervals −N/2<m<N/2 and −N/2<n<N/2. That is, $G_i'(m,n)$ is obtained as the spatial frequency component of the periodic function $g_i\exp(-i\varphi_i)$. Moreover, $G_i'(m+m_{iC}, n+n_{iC})$ is obtained from above equation (26) as a spatial frequency component of the high frequency function $g_i$.

Since the frequency components $G_i'(m+m_{iC}, n+n_{iC})$ of each hologram $g_i$ do not overlap each other, the complex amplitude G of the synthetic hologram Σ can be obtained by adding up $G_i'(m+m_{iC}, n+n_{iC})$ over a wide frequency band. In this method, it is not necessary to subdivide the sampling interval, it is not necessary to interpolate the data of the hologram, and it is possible to calculate the complex amplitude G at high speed.

(Other High-Speed Processing)

When calculating the spatial frequency component $G_i'(m, n)$, the high frequency function $g_i$ was converted to the low frequency function $g_i\exp(-i\varphi_i)$ to satisfy the inequality $f_M<1/(2d)$. Here, consider the discrete Fourier transform of following equation (27) for the sampling value $g_i(k,l)$ of the function $g_i$.

$$G_i(m, n) = \sum_{k=0}^{N-1}\sum_{l=0}^{N-1}g_i(k, l)\exp\left[-i2\pi\left(\frac{mk + nl}{N}\right)\right] \quad (27)$$

Since the maximum spatial frequency $f_M$ of the high-frequency function $g_i$ does not satisfy the inequality $f_M<1/(2d)$, the periodic function $g_i$ can not be accurately described using the spatial frequency components $G_i(m,n)$ in the intervals −N/2<m<N/2 and −N/2<n<N/2. However, as can be seen from above equation (27), $G_i(m,n)$ is a periodic function of period N with respect to m and n, and by using this periodicity and above equations (25) and (27), $G_i(m, N)=G_i'(m+m_{iC}, n+n_{iC})$ is obtained. Therefore, it becomes possible to accurately describe the high-frequency function $g_i$ using the frequency components $G_i(m,n)$ in the intervals $m_{iC}$−N/2<m<$m_{iC}$+N/2 and $n_{iC}$−N/2<n<$n_{iC}$+N/2. Even in the case where the frequency $f_M$ does not satisfy the inequality $f_M<1/(2d)$, the frequency components $G_i(m,n)$ of the function $g_i$ can be directly obtained by using the periodicity of $G_i(m,n)$ and above equation (27). Above equation (27) is simple compared with equation (25), and the spatial frequency components can be calculated faster using equation (27).

The 11th Embodiment: Imaging Device

Figure 25:
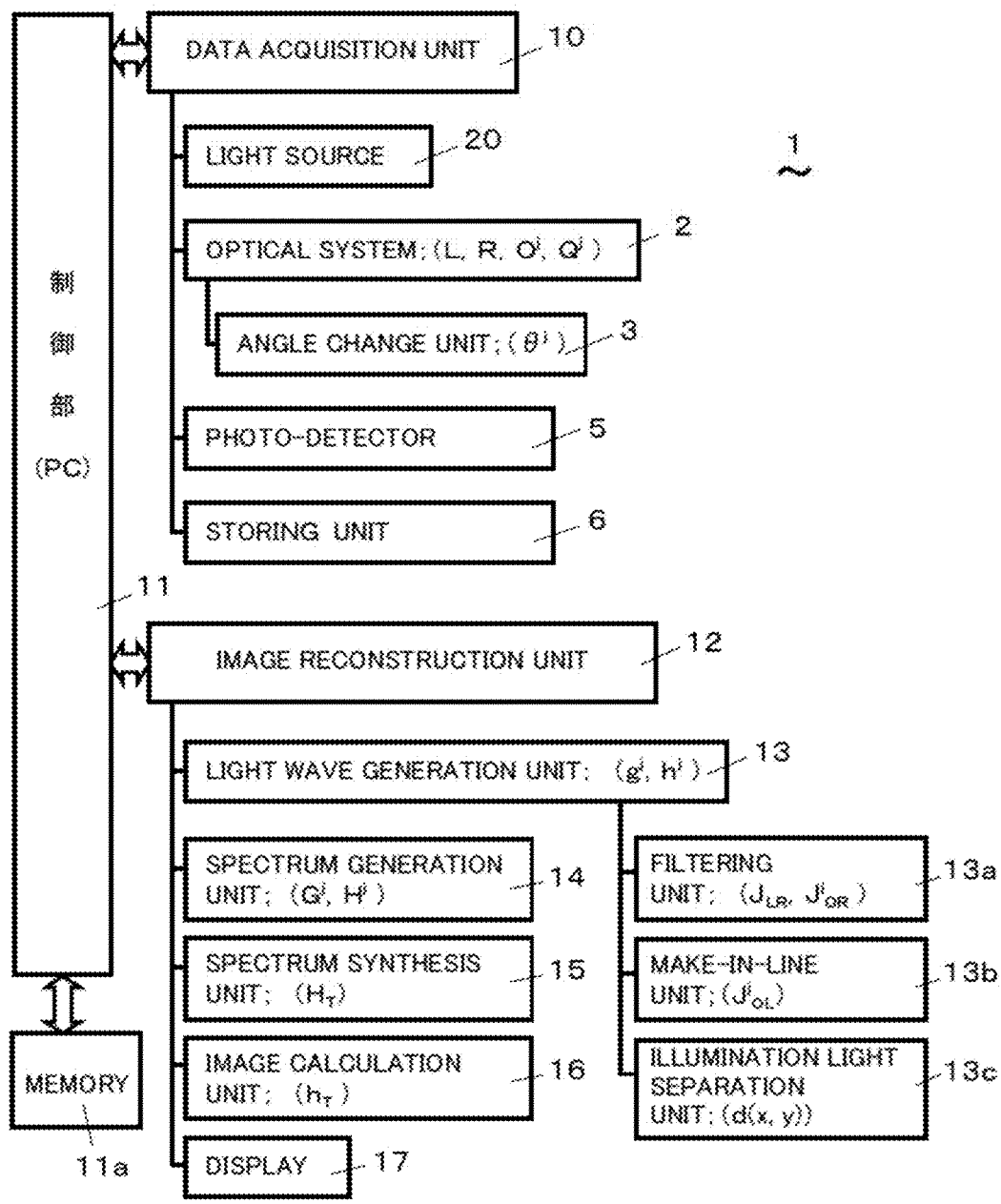
FIG. 25 is a block diagram showing the holographic imaging device according to the 11th embodiment.

FIG. 25 shows the holographic imaging device 1 according to the 11th embodiment. The holographic imaging device 1 comprises a data acquisition unit 10 that acquires holograms of the object 4 using the illumination lights Q whose incident directions are changed, and an image reconstruction unit 12 that reconstructs images from the holograms acquired by the data acquisition unit 10. The holographic imaging device 1 further comprises a control unit 11 that controls the data acquisition unit 10 and the image reconstruction unit 12, and a memory 11a that stores calculation programs such as FFT and control data and the like.

The data acquisition unit 10 includes a light source 20, an optical system 2, a photo-detector 5, and a storing unit 6. The light source 20 is a laser that emits coherent light. The optical system 2 includes an angle change unit 3, for sequentially or in an arbitrary manner, changing incident directions $\theta^j$, j=1, ..., N of the illumination light Q with respect to the object.

The optical system 2 generates illumination lights $Q^j$, j=1, ..., N using the angle change unit 3, an off-axis spherical wave reference light R, and an in-line spherical wave reference light L from the light emitted by the light source 20, and propagates those lights and object lights $O^j$ emitted from the object 4 illuminated with the illumination lights $Q^j$. The photo-detector 5 converts the light intensity into an electric signal and outputs it to the storing unit 6. The storing unit 6 performs processing for acquiring and storing the holograms $I_{LR}$, and $I^j_{OR}$, j=1, ..., N via the photo-detector 5.

The image reconstructing unit 12 performs the process of each step shown in FIG. 1, FIG. 3, FIG. 8, FIG. 9, and FIG. 10. In order to perform those processes, the image reconstruction unit 12 includes a light wave generation unit 13, a spectrum generation unit 14, a spectrum synthesis unit 15, an image calculation unit 16, and a display unit 17. The light wave generation unit 13 includes a filtering unit 13a, a make-in-line unit 13b, and an illumination light separation unit 13c. The filtering unit 13a applies spatial frequency filtering to the holograms $I^j_{OR}$, $I_{LR}$, etc. stored in the storing unit 6 to generate complex amplitude off-axis holograms $J^j_{OR}$, $J_{LR}$, and the like, respectively.

The make-in-line unit 13b generates complex amplitude in-line holograms $J^j_{OL}$, which has no components of the reference light R, by dividing the data of each complex amplitude off-axis hologram $J^j_{OR}$ generated by the filtering unit 13a by the data of the complex amplitude off-axis hologram $J_{LR}$ generated by the filtering unit 13a, respectively, to remove the components of the reference light R. The illumination light separation unit 13c separates the illumination light wave hologram d(x,y) from the hologram of the mixed lights of the object light O and the illumination light Q.

The spectrum generation unit 14 generates spatial frequency spectra G, H and the like from the object light wave holograms g, h and the like. The spectrum synthesis unit 15 generates a synthesized spatial frequency spectrum $H_T$ from spatial frequency spectra $H^j$ by calculating cross correlation functions.

The image calculation unit 16 derives an image $|h_T|^2$ from a synthetic object light hologram $h_T$. The display unit 17 is an FPD such as a liquid crystal display device and displays images and the like. Each unit of the image reconstruction unit 12 except for the display unit 17 is configured by using software including programs and its subroutine group operating on a computer.

Example 1: Configuration of Long Working Distance, Wide Field of View, Transmission Type Imaging Device Using the holographic imaging device, which has the angle change unit 3 shown in the 6th embodiment (FIG. 11), imaging tests were performed with a USAF test target as a subject (object 4). A green excitation solid-state laser (wavelength: 532 nm, output: 50 mW) was used as a light source, and an off-axis spherical wave reference light R was generated using an objective lens with a numerical aperture of 0.28. A monochrome camera link CCD camera was used as the photo-detector 5. The distance from the CCD to the target, the numerical aperture, and the recordable field size W are, respectively, $z_m$=52.4 cm, $NA_O$=0.019, and W=25 mm. The theoretical resolution is 14.0 μm, which is determined from the numerical aperture $NA_O$=0.019.

The configuration of the optical system of a holographic imaging device having a numerical aperture $NA_O$=0.019 can be regarded as a configuration in which the numerical aperture $NA_O$ of the photo-detector 5 with respect to the object light $O^j$, j=1, ..., N is close to zero, and the device becomes a configuration of an imaging device with a long working distance and a wide field of view. According to such an imaging device, a synthetic numerical aperture determined by a synthetic object light spatial frequency spectrum $H_T(u,v)$ approaches 1, when the synthetic spectrum $H_T(u,v)$ is generated by using data of a large number of object light holograms $I^j_{OR}$, j=1, ..., N.

(Result 1-1)

Figure 26:
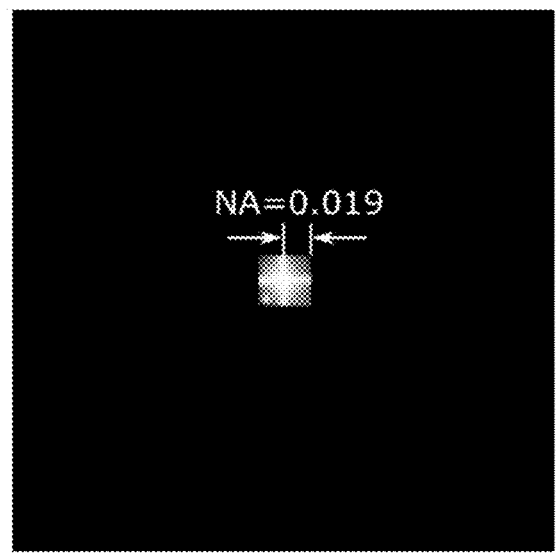
FIG. 26 is an image of a spatial frequency spectrum of an object light obtained by head-on illumination light (practical example 1-1).
Figure 27A:
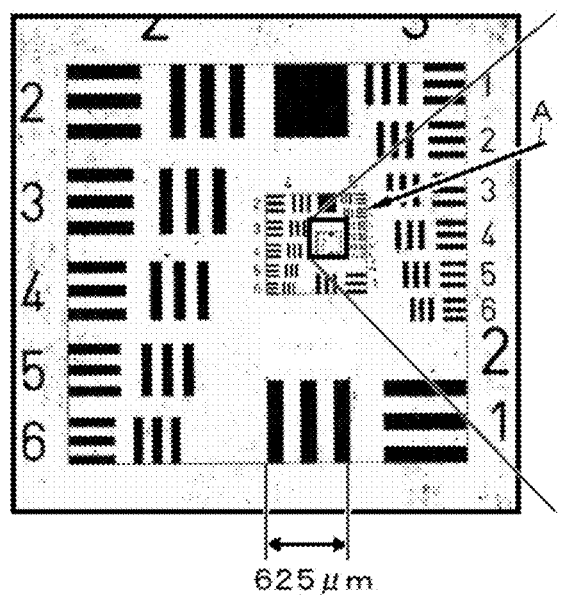
FIG. 27A is an image reconstructed from the spatial frequency spectrum of one sheet shown in FIG. 26.
Figure 27B:
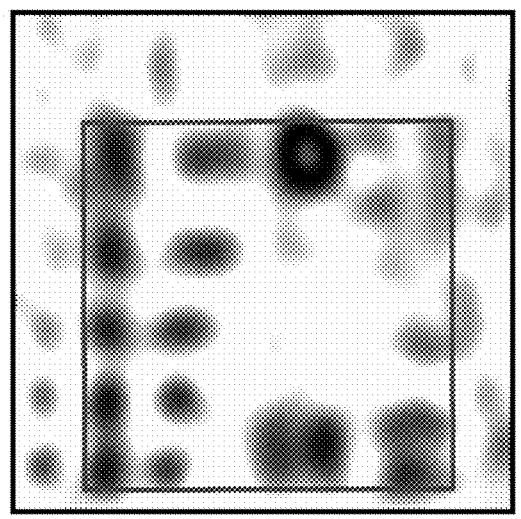
FIG. 27B is an enlarged image of a part of FIG. 27A.

FIG. 26 shows a spatial frequency spectrum of one object light hologram obtained by head-on illumination, and FIG. 27A and FIG. 27B show respectively an image and its partial enlarged image which are reconstructed using the spatial frequency spectrum of FIG. 26 at the position of distance $z_m$=52.4 cm from the CCD.

The numerical aperture $NA_O$=0.019 can be read from FIG. 26. The line width clearly distinguishable in FIG. 27A (indicated by arrow A) is 13.9 μm, and this value is in good agreement with the theoretical resolution value of 14.0 μm. As can be seen from the enlarged image in FIG. 27B of the reconstructed image, all lines of the 6- and 7-groups are ambiguous and can not be distinguished.

(Result 1-2)

Figure 28:
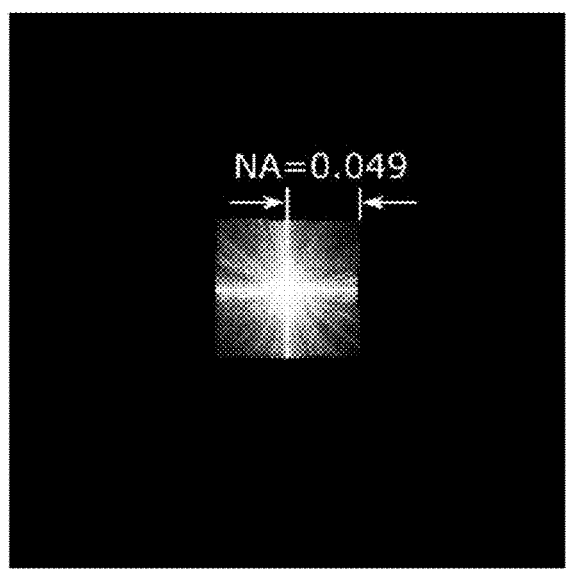
FIG. 28 is an image of a synthetic spatial frequency spectrum formed by synthesizing spatial frequency spectra of object lights obtained by illuminating an object from 9-directions (practical example 1-2).
Figure 29A:
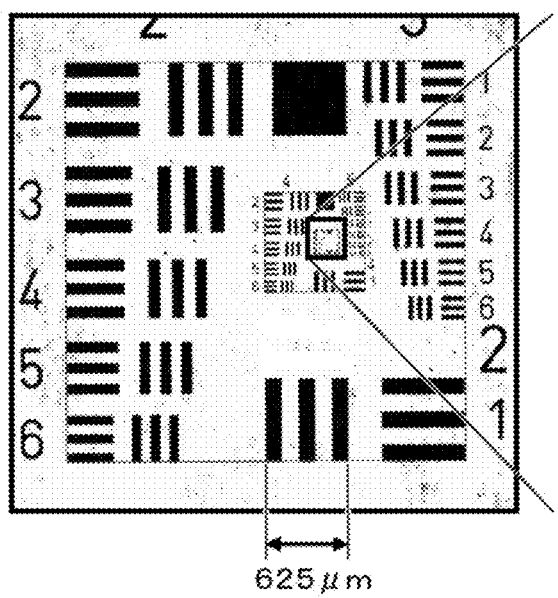
FIG. 29A is an image reconstructed from the synthetic spatial frequency spectrum shown in FIG. 28.
Figure 29B:
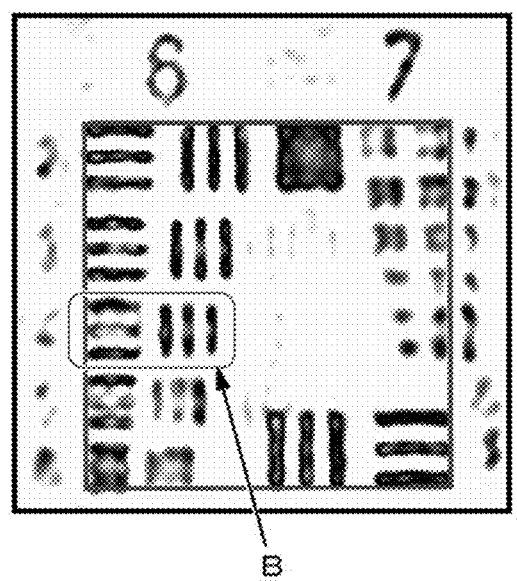
FIG. 29B is an enlarged image of a part of FIG. 29A.

FIG. 28 shows a synthetic spatial frequency spectrum synthesized by using nine object light holograms having different illumination directions, and FIG. 29A and FIG. 29B show an image and its partial enlarged image reconstructed using the synthetic spatial frequency spectrum of FIG. 28 at the position of distance $z_m$=52.4 cm from the CCD.

From FIG. 28, the synthetic numerical aperture $NA_S$=0.049 of the synthesized object light is obtained, and the theoretical resolution with respect to the numerical aperture 0.049 is 5.43 μm. In the enlarged image of FIG. 29B, clearly resolvable line width (indicated by arrow B) is 5.52 μm, and this value agrees well with the theoretical resolution value of 5.43 μm.

(Results 1-3)

FIG. 30A shows an image showing a synthetic spatial frequency spectrum obtained by synthesizing spatial frequency spectra of object lights by obtaining object light by each of illumination light from 49 directions, FIG. 30B shows a phase difference image of a synthetic object light obtained from the synthetic spatial frequency spectrum shown in FIG. 30A, wherein the difference is to the illumination light, and FIG. 31A and FIG. 31B show an image and its partial enlarged image reconstructed using the synthetic spatial frequency spectrum of FIG. 30A at the position of distance $z_m$=52.4 cm from the CCD.

From FIG. 30A, the synthetic numerical apertures in the longitudinal direction and the lateral direction of the synthetic object light are obtained as $NA_S$=0.142, and the theoretical resolution with respect to the numerical aperture 0.142 is 1.83 μm.

As can be seen from the enlarged image of FIG. 31B, all the lines of 7-group can be identified. Object light waves of high spatial frequency are added up by synthesizing the object lights, and high resolution is realized thereby. Any distortion is not observed in the phase difference image of FIG. 30B and in the outline of the rectangular region in FIG. 31A and FIG. 31B. That is, it can be confirmed that the outer shape of each rectangular region is constituted by a straight line without chipping of the corner, and it is understood that no distortion occurs in the reconstructed image at all. The phase difference image of FIG. 30B is an image showing the phase difference distribution between object light obtained from synthetic object light and illumination light. By obtaining the phase difference, it is possible to accurately evaluate the phase difference obtained as numerical values, which are generated while the light passes through the object. By obtaining the phase difference as numerical values, it is possible to accurately numerically evaluate the phase difference generated while the light passes through the object.

By increasing the distance from the photo-detector 5 (CCD) to the object 4 (subject), it is possible to increase the number of recording holograms (object light holograms), and also it is possible to record a high resolution image with even wider field of view. The above results show the effectiveness of a long working distance wide field of view holographic imaging device by the light wave synthesizing method of the present invention.

Example 2: Imaging Example Based on the Configuration of Ultra-High-Resolution, Reflective Imaging Device Using the holographic imaging device having the optical system 2 shown in the 9th embodiment (FIG. 16 to FIG. 21), imaging tests were performed using a USAF test target as a subject. A green excitation solid-state laser (wavelength: 532 nm, output: 50 mW) was used as a light source, and an off-axis reference light R and an in-line spherical wave reference light L were generated using an objective lens with a numerical aperture of 0.8. The in-line spherical wave reference light L was also used as a spherical wave light for illuminating the target from the front.

(Result 2-1)

Figure 32A:
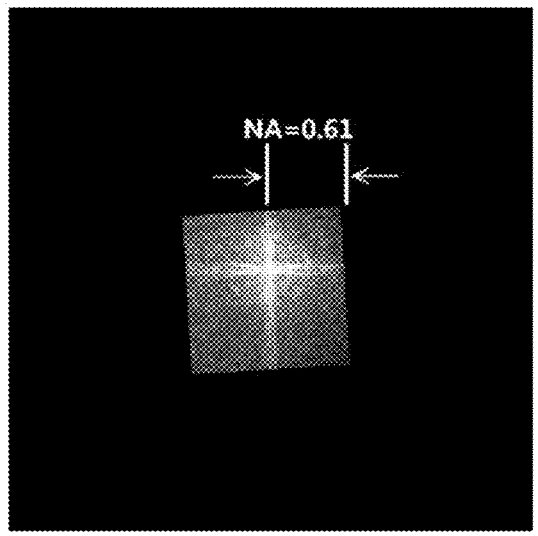
FIG. 32A is an image of a spatial frequency spectrum of an object light obtained by illuminating from the front with a head-on spherical wave illumination light.
Figure 32B:
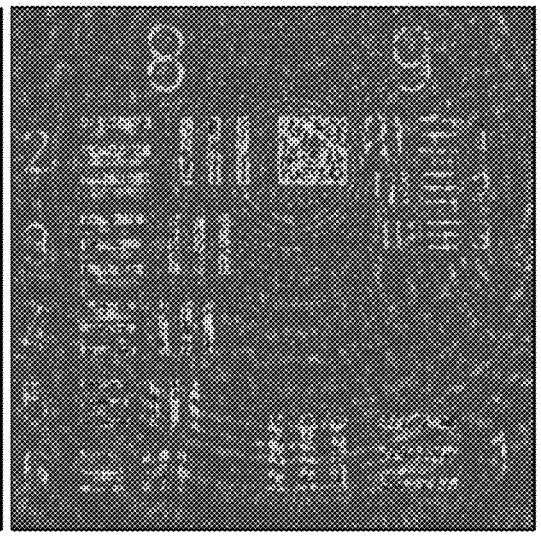
FIG. 32B is an image of phase difference, of a object light with respect to the illumination light, obtained using the spatial frequency spectrum of FIG. 32A (practical example 2-1).
Figure 33A:
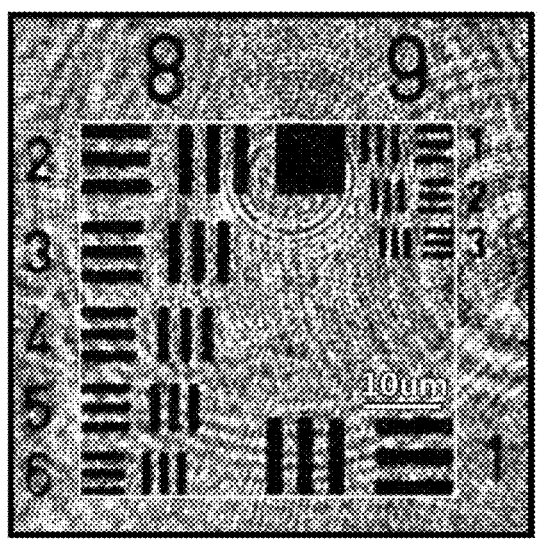
FIG. 33A is an image reconstructed from the spatial frequency spectrum of one sheet shown in FIG. 32A.
Figure 33B:
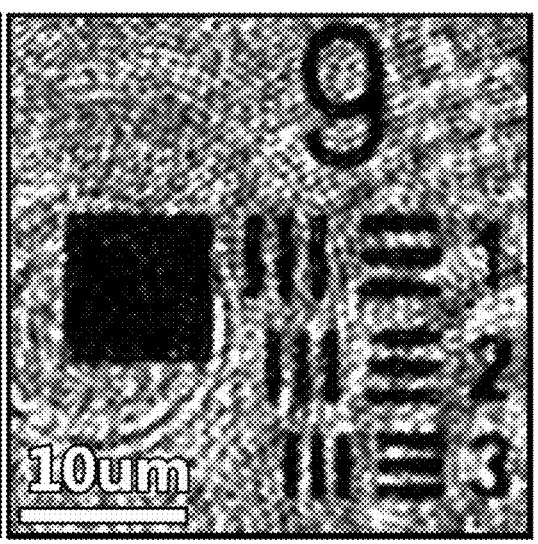
FIG. 33B is an enlarged image of a part of FIG. 33A.

FIG. 32A and FIG. 32B show, respectively, an image of a spatial frequency spectrum of one object light hologram obtained by illuminating from the front with a spherical wave illumination light and a phase difference image of an object light obtained from the same spatial frequency spectrum, wherein the difference is to the illumination light, and FIG. 33A and FIG. 33B show an image and its partial enlarged image reconstructed using the spatial frequency spectrum of FIG. 32A.

From FIG. 32A, the numerical aperture of the recorded object light is obtained as $NA_O$=0.61, and the theoretical resolution with respect to the numerical aperture 0.61 is 0.436 μm.

(Result 2-2)

Figure 34A:
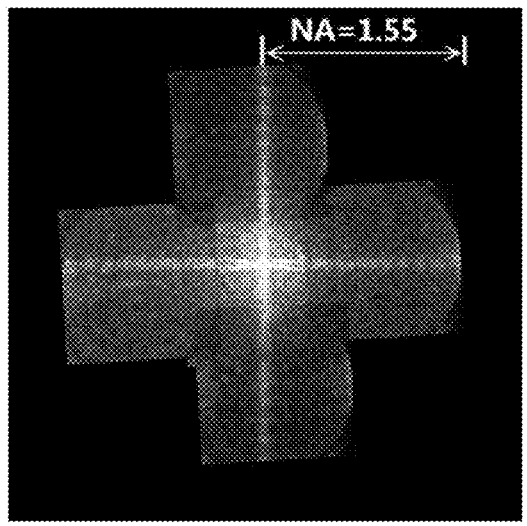
FIG. 34A is an image of a synthetic spatial frequency spectrum formed by synthesizing spatial frequency spectra of object lights obtained by illuminating an object from 5-directions.
Figure 34B:
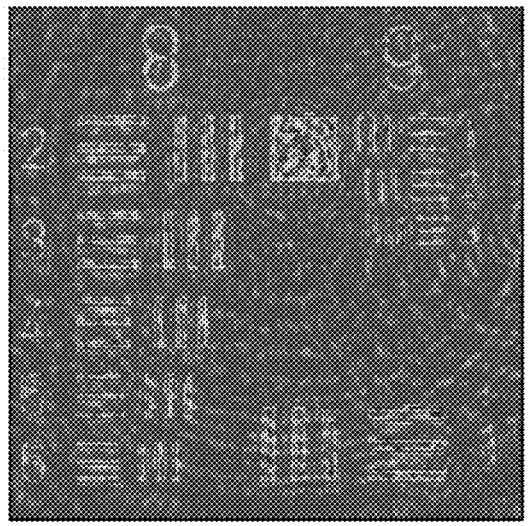
FIG. 34B is an image of phase difference, of a synthetic object light with respect to the illumination light, obtained using the synthetic spatial frequency spectrum of FIG. 34A (practical example 2-2).
Figure 35A:
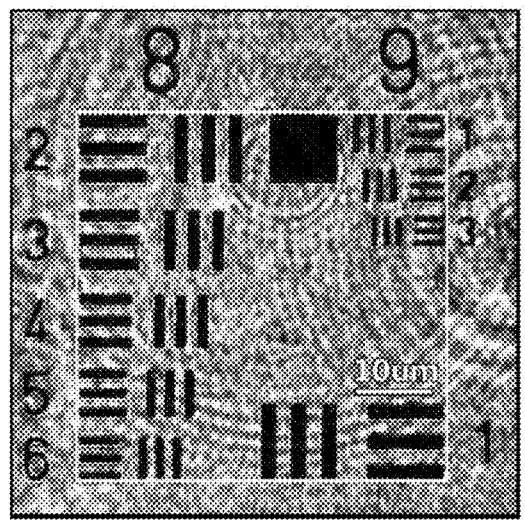
FIG. 35A is an image reconstructed from the synthetic spatial frequency spectrum shown in FIG. 34A.
Figure 35B:
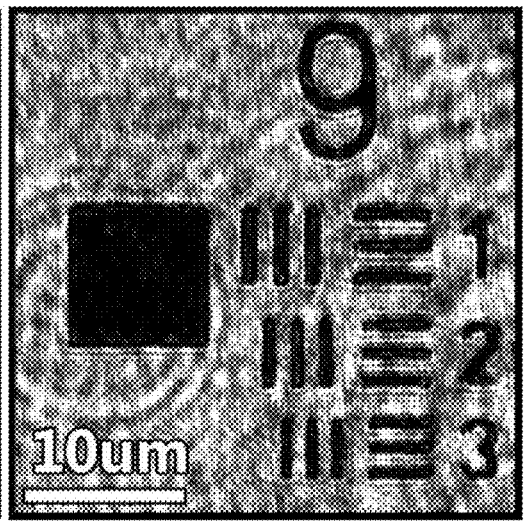
FIG. 35B is an enlarged image of a part of FIG. 35A.

FIG. 34A and FIG. 34B show, respectively, an image of a synthetic spatial frequency spectrum obtained by synthesizing spatial frequency spectra of each of object light holograms obtained using each of illumination lights from 5 directions and a phase difference image of a synthetic object light obtained from the same synthetic spatial frequency spectrum, wherein the difference is to the illumination light, and FIG. 35A and FIG. 35B show an image and its partial enlarged image reconstructed using the same synthetic spatial frequency spectrum.

From FIG. 34A, the synthetic numerical aperture of the recorded object light is obtained as $NA_S$=1.55, which exceeds 1, namely, which exceeds the theoretical limit value of the numerical aperture of a normal optical microscope. In the holographic imaging device used in this example, the optical system 2 is configured so that the numerical aperture $NA_O$ of the photo-detector 5 with respect to the object lights $O^j$, j=1, . . . , N is close to 1, therefore, the synthetic numerical aperture determined by the synthetic object light spatial frequency spectrum $H_T(u,v)$ becomes larger than 1. The theoretical resolution for the synthetic numerical aperture 1.55 is 0.172 μm. Comparing the image of FIG. 33B with the image of FIG. 35B, it can be seen that the outline of the line in FIG. 35B is sharpened due to the light wave synthesis.

The theoretical resolution with respect to the numerical aperture of 0.61 and the synthetic numerical aperture of 1.55 is smaller than the minimum line width of 0.78 μm of the 9-group, and all lines in the reconstructed images of FIG. 33B and FIG. 35B can be identified. No distortion is seen in the outline of the rectangular area in FIG. 33A and FIG. 35A, and it can be seen that there is no distortion in the reconstructed images.

By further increasing the numerical aperture of the objective lens and bringing the incident angle of the illumination light close to 90°, the value of the synthetic numerical aperture of the synthetic object light can be brought close to 2. In this example 2, no pinhole mask at the focal point P2 of the in-line spherical wave reference light L is used. By using such a pinhole mask, a clearer image can be obtained.

It is to be noted that the present invention is not limited to the above configurations and various modifications are possible. For example, the configuration of each of the embodiments described above can be combined with each other.

INDUSTRIAL APPLICABILITY

The device and method used therefor, according to the present invention, which are the holographic imaging device with long working distance and wide field of view or with ultra-high resolution and the data processing method realizing ultra-high resolution based on light wave synthesis, can do many things as follows: accurate recording of transmitted or reflected object light without using imaging lens; reconstruction of non-distorted object light using exact solutions of wave equation; recording and reconstruction of a 3-dimensional image with high resolution and wide field of view for the subject placed far from the photo-detector light receiving surface; acquisition of massive information of object lights by recording multi-number of holograms; recording and reconstruction of ultra-high resolution 3-dimensional image by synthesis of large numerical aperture object light; quantitative analysis of a translucent object using a phase difference image.

Therefore, the present invention can be applied to a wide range of applications in precise optical measurement field, cell differentiation and tissue formation field, regeneration medicine field, biotechnology field, medical diagnosis field, and the like. For example, high precision detection and measurement of microscopic scratches and dust on a large area surface making use of massive image information, precise optical measurement of fine particles in volume, long working distance wide field of view high-resolution measurement or ultra-high-resolution measurement of living tissue or living cells in culture solution, ultra-high-resolution measurement of living body tissue by low-energy illumination, ultra-high-resolution measurement of translucent living tissue using optical phase images, ultra-high-resolution three-dimensional optical measurement using reflected object light.

The holographic imaging device and the data processing method of the present invention, from the viewpoint of principle and technology, belong to the fields of optics, digital holography, optical measurement, applied light information, and microscopy, and from the viewpoint of technical application, belong to the fields of precision measurement, nanotechnology, cell differentiation and tissue formation, biological optical measurement, biotechnology, medical diagnosis, and the like.

EXPLANATIONS OF LETTERS OR NUMERALS

1 Holographic imaging device
2 Optical system

20 Light source
29 Condenser lens
20a Coherent light
22, 26, 27 Lens
3 Angle change unit
3a Rotating plate
3b Lens assembly
3c Deflecting element assembly
3d Reflecting mirror assembly
30 Center opening
31 Eccentric opening
4 Object
5 Photo-detector
10 Data acquisition unit
12 Image reconstruction unit
13 Light wave generation unit
14 Spectrum generation unit
15 Spectrum synthesis unit
Ax Optical axis (optical central axis)
$CF(u_s, v_s)$ Cross correlation function
$H^j(u,v)$, $H^{j'}(u,v)$ Object light spatial frequency spectrum
$H_T(u,v)$ Synthetic object light spatial frequency spectrum
$H^\alpha$, $H^\beta$ Pair spectra
$I_{LR}$ Reference light hologram
$I^j_{OR}$ Object light hologram
$I^{j'}_{OR}$ Head-on illuminated object light hologram
M3 Reflecting mirror
MB Micro spherical ball
MP Marking pattern
$NA_O$ Numerical aperture of object light (photo-detector)
$NA_Q$ Numerical aperture of illumination light
$NA_S$ Synthetic numerical aperture
O, $O^j$, $O^f$ Object light
Q, $Q^j$ Illumination light
$Q^f$ Head-on illumination light
$Q^k$ Specific illumination light
R Off-axis spherical wave reference light
L In-line spherical wave reference light
$a^{\alpha\beta}$ Fitting coefficient
$d(x,y)$ Illumination light wave hologram
$h^j(x,y)$ Object light wave hologram
$h^{j'}(x,y)$ Head-on illumination object light wave hologram
$h_T(u,v)$ Synthetic object light wave hologram
$z_a$ Arbitrary positions
$z_m$ Object position
$\theta^j$ Incident direction
$\xi(x,y)$ Illumination light wave phase component

The invention claimed is:

1. A holographic imaging device, comprising:
a data acquisition unit for acquiring a hologram of an object light (O) emitted from an object illuminated with an illumination light (Q), without passing the object light (O) through a lens; and
an image reconstruction unit for reconstructing an image of the object from the hologram acquired by the data acquiring unit, wherein
the data acquisition unit comprises:
an optical system for generating the illumination light (Q), an in-line spherical wave reference light (L) being in-line with the object light (O), and an off-axis spherical wave reference light (R) being off-axis with the object light (O), from a coherent light emitted from a light source, and for propagating those lights and the object light (O), and further for changing an incident direction of the illumination light (Q) to the object;
a photo-detector for converting light intensity into an electric signal and outputting the electric signal; and
a storing unit for acquiring and storing data of a plurality of object light holograms ($I^j_{OR}$, j=1, ..., N), which are off-axis holograms of interference fringes between the off-axis spherical wave reference light (R) and the object lights ($O^j$, j=1, ..., N) emitted from the object sequentially illuminated, respectively, with the illumination lights ($Q^j$, j=1, ..., N) generated by the optical system as parallel lights, including one vertical incident light, having mutually different incident directions ($\theta^j$, j=1, ..., N) to the object, and data of a reference light hologram ($I_{LR}$), which is an off-axis hologram of interference fringes between the off-axis spherical wave reference light (R) and the in-line spherical wave reference light (L), using the photo-detector, wherein
the image reconstruction unit comprises:
a light wave generation unit for generating object light wave holograms ($g^j(x,y)$, j=1, ..., N) at a hologram plane (z=0) defined at a light receiving surface of the photo-detector, which represent light waves of the object lights ($O^j$, j=1, ..., N) for the respective incident directions ($\theta^j$, j=1, ..., N), by using the data of the reference light hologram ($I_{LR}$) and the respective object light holograms ($I^j_{OR}$, j=1, ..., N);
a spectrum generation unit for generating spatial frequency spectra ($G^j(u,v)$, j=1, ..., N) at the hologram plane (z=0) by Fourier-transforming each of the object light wave holograms ($g^j(x,y)$, j=1, ..., N) and generating object light spatial frequency spectra ($H^j(u,v)$, j=1, ..., N) at an object position ($z=z_m$) by propagating each of the spatial frequency spectra ($G^j(u,v)$, j=1, ..., N) at the hologram plane (z=0) to the object position ($z=z_m$); and
a spectrum synthesis unit for generating a synthetic object light spatial frequency spectrum ($H_T(u,v)$), at the object position ($z=z_m$), based on a fact that the illumination lights used to acquire the data of the object lights are parallel lights, enlarged so as to occupy a wider frequency space, by moving and arranging each of the object light spatial frequency spectra ($H^j(u,v)$, j=1, ..., N) at the object position ($z=z_m$) in a two-dimensional space of a spatial frequency space (u,v) using a shift amount ($u^j_s$, $v^j_s$) derived based on calculation of a cross correlation function so that each of those object light spatial frequency spectra overlaps with another over an area in which changes of amplitude and phase are common to the mutually overlapped spectra, and by making the object light spatial frequency spectra ($H^j(u, v)$, j=1, ..., N) match mutually in the overlap area using fitting coefficients ($a^{\alpha\beta}$, $\alpha \neq \beta$, $\alpha$, $\beta$=1, ..., N) obtained for adjusting mutual amplitude and phase of the object light spatial frequency spectra ($H^j(u,v)$, j=1, ..., N) having the overlap area mutually, wherein
a synthetic object light wave hologram ($h_T(x,y)$) to be used for reconstruction of the image of the object is generated by inverse-Fourier transforming the synthetic object light spatial frequency spectrum ($H_T(u,v)$) generated by the spectrum synthesis unit.

2. The holographic imaging device according to claim 1, wherein
the optical system is configured so that a numerical aperture ($NA_O$) of the photo-detector with respect to the object lights ($O^j$, j=1, ..., N) is a value close to zero, and a synthetic numerical aperture ($NA_S$), which is determined by the synthetic object light spatial frequency spectrum ($H_T(u,v)$), approaches 1 by generating the synthetic object light spatial frequency spectrum ($H_T(u,v)$) using data of a large number of the object light holograms ($J_{OR}^j$, j=1, ..., N).

3. The holographic imaging device according to claim 2, wherein
the optical system comprises an angle change unit for changing the incident direction of the illumination light (Q) to the object, and the angle change unit comprises:
a rotating plate having a circular center opening with a shutter and an eccentric opening provided at an eccentric position, for receiving a cone shape light diverging around an optical central axis going to the center of the photo-detector and for distributing a part of the diverging cone shape light as the illumination light (Q) by intermittently rotating around the central axis;
a lens assembly having a plurality of lenses arranged around the central axis, for making each of the lights distributed by the rotating plate into a parallel light; and
a deflection element assembly having a plurality of prisms or diffraction gratings, for changing the direction of the parallel lights so that each of the parallel lights from the lens assembly passes through one point on the central axis by intersecting the central axis at the point at a predetermined angle.

4. The holographic imaging device according to claim 1, wherein
the optical system is configured so that a numerical aperture ($NA_O$) of the photo-detector with respect to the object light ($O^j$, j=1, ..., N) is a value close to 1, and a synthetic numerical aperture ($NA_S$), which is determined by the synthetic object light spatial frequency spectrum ($H_T(u,v)$), exceeds 1.

5. The holographic imaging device according to claim 4, wherein
when the holographic imaging device is used as a reflection type microscope,
a micro spherical ball is provided at a position between the photo-detector and the object and close to a surface of the object illuminated with the illumination light (Q), wherein
a reflected light from a spherical surface of the micro spherical ball is used as the off-axis spherical wave reference light (R).

6. The holographic imaging device according to claim 5, wherein
the optical system comprises an angle change unit for changing the incident direction of the illumination light (Q) to the object, and the angle change unit comprises:
a rotating plate having a circular center opening with a shutter and an eccentric opening provided at an eccentric position, for receiving a cone shape light diverging around an optical central axis going to the center of the photo-detector and for distributing a part of the diverging cone shape light as the illumination light (Q) by intermittently rotating around the central axis;
a lens assembly having a plurality of lenses arranged around the central axis, for making each of the lights distributed by the rotating plate into a parallel light; and
a reflecting mirror assembly having a plurality of reflecting mirrors, for changing the direction of the parallel lights so that each of the parallel lights from the lens assembly passes through one point on the central axis by intersecting the central axis at the point at a predetermined angle.

7. The holographic imaging device according to claim 4, wherein
when the holographic imaging device is used as a transmission type microscope,
a condenser lens is arranged in front of the object which is disposed in front of the photo-detector, so as to have a focal point at a position on a surface of the object illuminated with the illumination light (Q), wherein
the in-line spherical wave reference light (L) is generated through the condenser lens in the absence of the object, and
the off-axis spherical wave reference light (R) is generated by making a parallel light that has a tilted optical axis enter the condenser lens, so as to be converged at a position close to the surface of the object illuminated with the illumination light (Q).

8. The holographic imaging device according to claim 7, wherein
the optical system comprises an angle change unit for changing the incident direction of the illumination light (Q) to the object, and the angle change unit comprises:
a rotating plate having a circular center opening with a shutter and an eccentric opening provided at an eccentric position for receiving a cone shape light diverging around an optical central axis going to the center of the photo-detector and for distributing a part of the diverging cone shape light as the illumination light (Q) by intermittently rotating around the central axis;
a lens assembly having a plurality of lenses arranged around the central axis, for making each of the lights distributed by the rotating plate into a parallel light; and
a reflecting mirror assembly having a plurality of reflecting mirrors, for changing the direction of the parallel lights so that each of the parallel lights from the lens assembly passes through one point on the central axis by intersecting the central axis at the point at a predetermined angle.

9. The holographic imaging device according to claim 4, wherein
the optical system comprises an angle change unit for changing the incident direction of the illumination light (Q) to the object, and the angle change unit comprises:
a rotating plate having a circular center opening with a shutter and an eccentric opening provided at an eccentric position for receiving a cone shape light diverging around an optical central axis going to the center of the photo-detector and for distributing a part of the diverging cone shape light as the illumination light (Q) by intermittently rotating around the central axis;
a lens assembly having a plurality of lenses arranged around the central axis, for making each of the lights distributed by the rotating plate into a parallel light; and
a reflecting mirror assembly having a plurality of reflecting mirrors, for changing the direction of the parallel lights so that each of the parallel lights from the lens assembly passes through one point on the central axis by intersecting the central axis at the point at a predetermined angle.

10. A data processing method used for a holographic imaging device, comprising the steps of:
acquiring data of a plurality of object light holograms ($J_{OR}^j$, j=1, ..., N), which are off-axis holograms of interference fringes between object lights ($O^j$, j=1, ..., N) emitted from an object sequentially illuminated with illumination lights ($Q^j$, j=1, ..., N) and an off-axis spherical wave reference light (R) being off-axis with respect to the object lights ($O^j$, j=1, ..., N), without passing the object lights ($O^j$, j=1, ..., N) through a lens, wherein the illumination lights ($Q^j$, j=1, ..., N) are composed of parallel lights, including one vertical incident light, having mutually different incident directions ($\theta^j$, j=1, . . . , N) to the object and the data is acquired for each of the incident directions;

acquiring data of a reference light hologram ($I_{LR}$), which is an off-axis hologram of interference fringes between an in-line spherical wave reference light (L) being in-line with the object lights ($O^j$, j=1, . . . , N) and the off-axis spherical wave reference light (R);

generating object light wave holograms ($g^j(x,y)$, j=1, . . . , N), which represent light waves of the object lights ($O^j$, j=1, . . . , N) at a hologram plane (z=0) by using the data of the reference light hologram ($I_{LR}$) and the respective object light holograms ($I^j_{OR}$, j=1, . . . , N);

generating spatial frequency spectra ($G^j(u,v)$, j=1, . . . , N) at the hologram plane (z=0) by Fourier-transforming each of the object light wave holograms ($g^j(x,y)$, j=1, . . . , N) and generating object light spatial frequency spectra ($H^j(u,v)$, j=1, . . . , N)) at an object position ($z=z_m$) by propagating each of the spatial frequency spectra ($G^j(u,v)$, j=1, . . . , N) at the hologram plane (z=0) to the object position ($z=z_m$)

generating a synthetic object light spatial frequency spectrum ($H_T(u,v)$), at the object position ($z=z_m$), based on a fact that the illumination lights used to acquire the data of the object lights are parallel lights, enlarged so as to occupy a wider frequency space, by moving and arranging each of the object light spatial frequency spectra ($H^j(u,v)$, j=1, . . . , N) at the object position ($z=z_m$) in a two-dimensional space of a spatial frequency space (u,v) using a shift amount ($u^j_s$, $v^j_s$) derived based on calculation of a cross correlation function so that each of those object light spatial frequency spectra overlaps with another over an area in which changes of amplitude and phase are common to the mutually overlapped spectra, and by making the object light spatial frequency spectra ($H^j(u,v)$, j=1, . . . , N) match mutually in the overlap area using fitting coefficients ($a^{\alpha\beta}$, $\alpha \neq \beta$, $\alpha$, $\beta$=1, . . . , N) obtained for adjusting mutual amplitude and phase of the object light spatial frequency spectra ($H^j(u,v)$, j=1, . . . , N) having the overlap area mutually; and generating a synthetic object light wave hologram ($h_T(x, y)$) used for reconstruction of the image of the object, by inverse-Fourier transforming the synthetic object light spatial frequency spectrum ($H_T(u,v)$).

11. The data processing method according to claim 10, wherein the fitting coefficients ($a^{\alpha\beta}$, $\alpha \neq \beta$, $\alpha$, $\beta$=1, . . . , N) are obtained as an average value of ratios of the mutual spectrum values at each point (u,v) contained in the overlap area of pair spectra ($H^\alpha$, $H^\beta$, $\alpha \neq \beta$) made of two of the object light spatial frequency spectra ($H^j(u,v)$, j=1, . . . , N) mutually having the overlap area in common, and one of the pair spectrum ($H^\alpha$, $H\beta$) is matched to the other by adjusting the amplitude value and the phase value thereof at each point.

12. The data processing method according to claim 11, further comprising the steps of:

generating an illumination light wave hologram ($d(x,y)$) representing a light wave of a specific illumination light ($Q^k$) at the position ($z=z_m$) of the object using a specific object light hologram ($I^k_{OR}$) and the reference light hologram ($I_{LR}$), wherein the specific object light hologram ($I^k_{OR}$) is one of the object light holograms ($I^j_{OR}$, j=1, . . . , N) and contains information on the specific illumination light ($Q^k$) being any one of the illumination lights ($Q^j$, j=1, . . . , N);

deriving an illumination light wave phase component ($\xi(x,y)=d(x,y)/|d(x,y)|$) of the specific illumination light ($Q^k$) using the illumination light wave hologram ($d(x,y)$); and generating a phase-adjusted synthetic object light wave hologram ($h_T(x,y)/\xi(x,y)$) by dividing the synthetic object light wave hologram ($h_T(x,y)$) by the illumination light wave phase component ($\xi(x,y)$).

13. The data processing method according to claim 11, further comprising the steps of:

acquiring data of a head-on illuminated object light hologram ($I^f_{OR}$) which is an off-axis hologram of interference fringes between an object light ($O^f$) emitted from the object illuminated with a head-on illumination light ($Q^f$) of a nonparallel light instead of the vertical incident light which is the parallel light, the head-on illumination light ($Q^f$), and the off-axis spherical wave reference light (R);

generating a head-on illuminated object light wave hologram ($h^f(x,y)$) representing a light wave of the object light ($O^f$) caused by the head-on illumination, and an illumination light wave hologram ($d(x,y)$) representing a light wave of the head-on illumination light ($Q^f$), at the position ($z=z_m$) of the object, by using the reference light hologram ($I_{LR}$) and the head-on illuminated object light hologram ($I^f_{OR}$);

deriving an illumination light wave phase component ($\xi(x,y)=d(x,y)/|d(x,y)|$) about the head-on illumination light ($Q^f$) using the illumination light wave hologram ($d(x,y)$);

generating a phase-adjusted head-on illuminated object light wave hologram ($h^f(x, y)/(\xi(x,y))$) by dividing the head-on illuminated object light wave hologram ($h^f(x, y)$) by the illumination light wave phase component ($\xi(x,y)$);

generating an object light spatial frequency spectrum ($H^f(u,v)$) of the object light ($O^f$) caused by the head-on illumination, by Fourier-transforming the phase-adjusted head-on illuminated object light wave hologram ($h^f(x,y)/(\xi(x,y))$); and generating the synthetic object light spatial frequency spectrum ($H_T(u,v)$) by sequentially arranging the object light spatial frequency spectra ($H^j(u,v)$, j=1, . . . , N) with reference to the object light spatial frequency spectrum ($H^f(u,v)$) based on calculation of a cross correlation function.

14. The data processing method according to claim 11, further comprising the steps of:

generating a synthetic object light spatial frequency spectrum ($H_{Ta}(u,v)$) at an arbitrary position ($z=z_a$), by making the object light spatial frequency spectra ($H^j(u,v)$, j=1, . . . , N) at the position ($z=z_m$) of the object into object light spatial frequency spectra ($H^j_a(u,v)$, j=1, . . . , N) at an arbitrary position ($z=z_a$), and then performing the same processing performed at the position ($z=z_m$) of the object, in which each of the object light spatial frequency spectra ($H^j(u,v)$, j=1, . . . , N) is moved and matched using the fitting coefficients ($a^{\alpha\beta}$); and generating a synthetic object light wave hologram ($h_{Ta}(x, y)=F^{-1}(H_{Ta}(u,v))$ at the arbitrary position ($z=z_a$) by inverse-Fourier transforming the synthetic object light spatial frequency spectrum ($H_{Ta}(u,v)$) at the arbitrary position ($z=z_a$).

15. The data processing method according to claim 10, further comprising the steps of:

generating an illumination light wave hologram ($d(x,y)$) representing a light wave of a specific illumination light ($Q^k$) at the position ($z=z_m$) of the object using a specific object light hologram ($I^k_{OR}$) and the reference light hologram ($I_{LR}$), wherein the specific object light hologram ($I^k_{OR}$) is one of the object light holograms ($I^j_{OR}$, j=1, ..., N) and contains information on the specific illumination light ($Q^k$) being any one of the illumination lights ($Q^j$, j=1, ..., N);

deriving an illumination light wave phase component ($\xi(x,y)=d(x,y)/|d(x,y)|$) of the specific illumination light ($Q^k$) using the illumination light wave hologram ($d(x,y)$); and generating a phase-adjusted synthetic object light wave hologram ($h_T(x,y)/\xi(x,y)$) by dividing the synthetic object light wave hologram ($h_T(x,y)$) by the illumination light wave phase component ($\xi(x,y)$).

16. The data processing method according to claim 15, further comprising the steps of:

generating a synthetic object light spatial frequency spectrum ($H_{Ta}(u,v)$) at an arbitrary position ($z=z_a$), by making the object light spatial frequency spectra ($H^j(u,v)$, j=1, ..., N) at the position ($z=z_m$) of the object into object light spatial frequency spectra ($H^j_a(u,v)$, j=1, ..., N) at an arbitrary position ($z=z_a$), and then performing the same processing performed at the position ($z=z_m$) of the object, in which each of the object light spatial frequency spectra ($H^j(u,v)$, j=1, ..., N) is moved and matched using the fitting coefficients ($a^{\alpha\beta}$); and generating a synthetic object light wave hologram ($h_{Ta}(x,y)=F^{-1}(H_{Ta}(u,v))$ at the arbitrary position ($z=z_a$) by inverse-Fourier transforming the synthetic object light spatial frequency spectrum ($H_{Ta}(u,v)$) at the arbitrary position ($z=z_a$).

17. The data processing method according to claim 10, further comprising the steps of:

acquiring data of a head-on illuminated object light hologram ($I^f_{OR}$) which is an off-axis hologram of interference fringes between an object light ($O^f$) emitted from the object illuminated with a head-on illumination light ($Q^f$) of a nonparallel light instead of the vertical incident light which is the parallel light, the head-on illumination light ($Q^f$), and the off-axis spherical wave reference light (R);

generating a head-on illuminated object light wave hologram ($h^f(x,y)$) representing a light wave of the object light ($O^f$) caused by the head-on illumination, and an illumination light wave hologram ($d(x,y)$) representing a light wave of the head-on illumination light ($Q^f$), at the position ($z=z_m$) of the object, by using the reference light hologram ($I_{LR}$) and the head-on illuminated object light hologram ($I^f_{OR}$);

deriving an illumination light wave phase component ($\xi(x,y)=d(x,y)/|d(x,y)|$) about the head-on illumination light ($Q^f$) using the illumination light wave hologram ($d(x,y)$);

generating a phase-adjusted head-on illuminated object light wave hologram ($h^f(x,y)/\xi(x,y)$) by dividing the head-on illuminated object light wave hologram ($h^f(x,y)$) by the illumination light wave phase component ($\xi(x,y)$);

generating an object light spatial frequency spectrum ($H^f(u,v)$) of the object light ($O^f$) caused by the head-on illumination, by Fourier-transforming the phase-adjusted head-on illuminated object light wave hologram ($h^f(x,y)/\xi(x,y)$); and generating the synthetic object light spatial frequency spectrum ($H_T(u,v)$) by sequentially arranging the object light spatial frequency spectra ($H^j(u,v)$, j=1, ..., N) with reference to the object light spatial frequency spectrum ($H^f(u,v)$) based on calculation of a cross correlation function.

18. The data processing method according to claim 10, further comprising the steps of:

generating a synthetic object light spatial frequency spectrum ($H_{Ta}(u,v)$) at an arbitrary position ($z=z_a$), by making the object light spatial frequency spectra ($H^j(u,v)$, j=1, ..., N) at the position ($z=z_m$) of the object into object light spatial frequency spectra ($H^j_a(u,v)$, j=1, ..., N) at an arbitrary position ($z=z_a$), and then performing the same processing using the shift amount ($u^j_s$, $v^j_s$) and the fitting coefficients ($a^{\alpha\beta}$) used in the processing performed at the position ($z=z_m$) of the object, in which each of the object light spatial frequency spectra ($H^j(u,v)$, j=1, ..., N) is moved and matched using the shift amount ($u^j_s$, $v^j_s$) and the fitting coefficients ($a^{\alpha\beta}$); and generating a synthetic object light wave hologram ($h_{Ta}(x,y)=F^{-1}(H_{Ta}(u,v))$ at the arbitrary position ($z=z_a$) by inverse-Fourier transforming the synthetic object light spatial frequency spectrum ($H_{Ta}(u,v)$) at the arbitrary position ($z=z_a$).

19. The data processing method according to claim 10, wherein the data of the object light holograms ($I^j_{OR}$, j=1, ..., N) is acquired by placing a marking pattern behind the object being translucent or in front of the object, and the calculation of the cross correlation function is performed based on a spatial frequency spectrum corresponding to the marking pattern.

20. A holographic imaging device, comprising:

a data acquisition unit for acquiring a hologram of an object light (O) emitted from an object illuminated with an illumination light (Q); and an image reconstruction unit for reconstructing an image of the object from the hologram acquired by the data acquiring unit, wherein the data acquisition unit comprises:

an optical system for generating the illumination light (Q), an in-line spherical wave reference light (L) being in-line with the object light (O), and an off-axis spherical wave reference light (R) being off-axis with the object light (O), from a coherent light emitted from a light source, and for propagating those lights and the object light (O), and further for changing an incident direction of the illumination light (Q) to the object;

a photo-detector for converting light intensity into an electric signal and outputting the electric signal; and a storing unit for acquiring and storing data of a plurality of object light holograms ($I^j_{OR}$, j=1, ..., N), which are off-axis holograms of interference fringes between the off-axis spherical wave reference light (R) and the object lights ($O^j$, j=1, ..., N) emitted from the object sequentially illuminated, respectively, with the illumination lights ($Q^j$, j=1, ..., N) generated by the optical system as parallel lights, including one vertical incident light, having mutually different incident directions ($\theta^j$, j=1, ..., N) to the object, and data of a reference light hologram ($I_{LR}$), which is an off-axis hologram of interference fringes between the off-axis spherical wave reference light (R) and the in-line spherical wave reference light (L), using the photo-detector, wherein the image reconstruction unit comprises:

a light wave generation unit for generating object light wave holograms ($g^j(x,y)$, $j=1, \ldots, N$) at a hologram plane ($z=0$) defined at a light receiving surface of the photo-detector, which represent light waves of the object lights ($O^j$, $j=1, \ldots, N$) for the respective incident directions ($\theta^j$, $j=1, \ldots, N$), by using the data of the reference light hologram ($I_{LR}$) and the respective object light holograms ($I^j_{OR}$, $j=1, \ldots, N$);

a spectrum generation unit for generating spatial frequency spectra ($G^j(u,v)$, $j=1, \ldots, N$) at the hologram plane ($z=0$) by Fourier-transforming each of the object light wave holograms ($g^j(x,y)$, $j=1, \ldots, N$) and generating object light spatial frequency spectra ($H^j(u,v)$, $j=1, \ldots, N$) at an object position ($z=z_m$) by propagating each of the spatial frequency spectra ($G^j(u,v)$, $j=1, \ldots, N$) at the hologram plane ($z=0$) to the object position ($z=z_m$); and a spectrum synthesis unit for generating a synthetic object light spatial frequency spectrum ($H_T(u,v)$) enlarged so as to occupy a wider frequency space, by moving and arranging each of the object light spatial frequency spectra ($H^j(u,v)$, $j=1, \ldots, N$) in a two-dimensional space of a spatial frequency space (u,v) based on calculation of a cross correlation function so that each of those object light spatial frequency spectra overlaps with another over an area in which changes of amplitude and phase are common to the mutually overlapped spectra, and by making the object light spatial frequency spectra ($H^j(u,v)$, $j=1, \ldots, N$) match mutually in the overlap area using fitting coefficients ($a^{\alpha\beta}$, $\alpha \neq \beta$, $\alpha, \beta = 1, \ldots, N$) obtained for adjusting mutual amplitude and phase of the object light spatial frequency spectra ($H^j(u,v)$, $j=1, \ldots, N$) having the overlap area mutually, wherein a synthetic object light wave hologram ($h_T(x,y)$) to be used for reconstruction of the image of the object is generated by inverse-Fourier transforming the synthetic object light spatial frequency spectrum ($H_T(u,v)$) generated by the spectrum synthesis unit, wherein, the optical system comprises an angle change unit for changing the incident direction of the illumination light (Q) to the object, and the angle change unit comprises:

a rotating plate having a circular center opening with a shutter and an eccentric opening provided at an eccentric position, for receiving a cone shape light diverging around an optical central axis going to the center of the photo-detector and for distributing a part of the diverging cone shape light as the illumination light (Q) by intermittently rotating around the central axis;

a lens assembly having a plurality of lenses arranged around the central axis, for making each of the lights distributed by the rotating plate into a parallel light; and a deflection element assembly having a plurality of prisms or diffraction gratings, or a reflecting mirror assembly having a plurality of reflecting mirrors, for changing the direction of the parallel lights so that each of the parallel lights from the lens assembly passes through one point on the central axis by intersecting the central axis at the point at a predetermined angle.

\* \* \* \* \*